United States Patent
Tashiro et al.

(10) Patent No.: US 7,554,631 B2
(45) Date of Patent: Jun. 30, 2009

(54) LIQUID CRYSTAL DISPLAY DEVICE

(75) Inventors: Kunihiro Tashiro, Kawasaki (JP);
Yasutoshi Tasaka, Kawasaki (JP);
Hidefumi Yoshida, Kawasaki (JP);
Yoshinori Tanaka, Tottori (JP); Seiji Doi, Kameyama (JP); Tomoshige Oda, Kawasaki (JP); Manabu Sawasaki, Kawasaki (JP); Tomonori Tanose, Tottori (JP); Takashi Takagi, Kawasaki (JP); Isao Tsushima, Yonago (JP); Tetsuya Fujikawa, Tottori (JP); Norio Sugiura, Iwata (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 11/300,646

(22) Filed: Dec. 15, 2005

(65) Prior Publication Data
US 2007/0291200 A1   Dec. 20, 2007

(30) Foreign Application Priority Data
Dec. 16, 2004   (JP)   ............................. 2004-364750

(51) Int. Cl.
*G02F 1/1335*   (2006.01)
(52) U.S. Cl. ........................................ 349/113; 349/114

(58) Field of Classification Search .................. 349/113, 349/114, 112, 106, 138, 129, 191, 38, 139, 349/143
See application file for complete search history.

(56) References Cited

U.S. PATENT DOCUMENTS

| | | | |
|---|---|---|---|
| 6,208,395 | B1 | 3/2001 | Kanoh et al. |
| 2001/0033350 | A1 | 10/2001 | Kobayashi et al. |
| 2005/0083454 | A1* | 4/2005 | Sumi ........................ 349/113 |

FOREIGN PATENT DOCUMENTS

| | | |
|---|---|---|
| JP | 3-164716 A | 7/1991 |
| JP | 5-173158 | 7/1993 |
| JP | 2990046 | 10/1999 |
| JP | 2002-365622 | 12/2002 |
| JP | 2003-188005 A | 7/2003 |

OTHER PUBLICATIONS

Taiwanese Office Action w/partial English translation mailed Aug. 22, 2008 in corresponding Taiwanese application 094144961.

* cited by examiner

*Primary Examiner*—Thoi V Duong
(74) *Attorney, Agent, or Firm*—Nixon & Vanderhye P.C.

(57) ABSTRACT

By circular or polygonal openings formed in at least one of a metal film, a semiconductor film, an insulating film and the like, which films are below a reflecting electrode, minute irregularities are densely formed on a surface of the reflecting electrode. In this case, it is required that a linear density defined by peripheral dimensions of the openings per unit area is equal to 0.2 or more.

15 Claims, 22 Drawing Sheets

FIG. 8

| LAYER | EXPOSURE | FILM | MASK DIMENSION Lm | MASK DIMENSION Sm | FINISHED DIMENSION L | FINISHED DIMENSION S | LINEAR DENSITY OF OPENINGS | LINEAR DENSITY OF PROTRUSIONS |
|---|---|---|---|---|---|---|---|---|
| G, I | STEPPER | ELECTRODE FILM (METAL FILM) | 2.75<br>2.75<br>3<br>4 | 2.75<br>3<br>3<br>4 | 1.75<br>1.75<br>2<br>3 | 3.75<br>4<br>4<br>5 | 0.389<br>0.380<br>0.349<br>0.245 | 0.182<br>0.166<br>0.174<br>0.147 |
| SA | PROXIMITY | CHANNEL PROTECTION FILM (SECOND INSULATING FILM) | 7 | 7 | 5 | 9 | 0.144 | 0.080 |
| C | STEPPER | FINAL PROTECTIVE FILM (THIRD INSULATING FILM) | 2.75<br>3<br>4<br>4 | 2.75<br>3<br>3<br>4 | 0.75<br>1<br>2<br>2 | 4.75<br>5<br>5<br>6 | 0.493<br>0.436<br>0.320<br>0.294 | 0.078<br>0.087<br>0.128<br>0.098 |

FIG. 22A
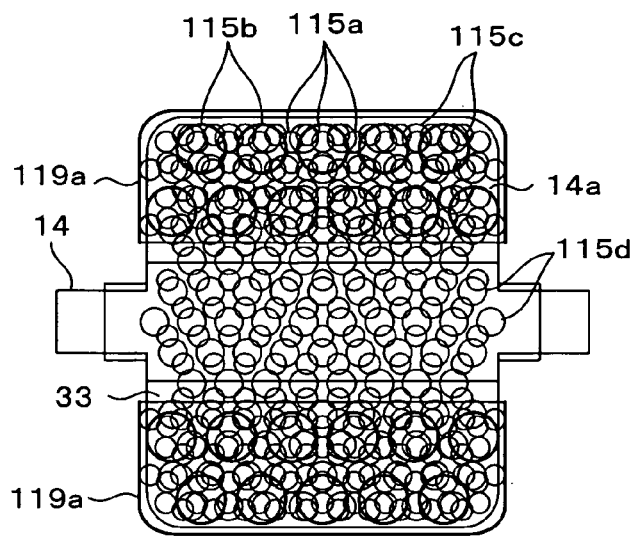
FIG. 22B
FIG. 22C
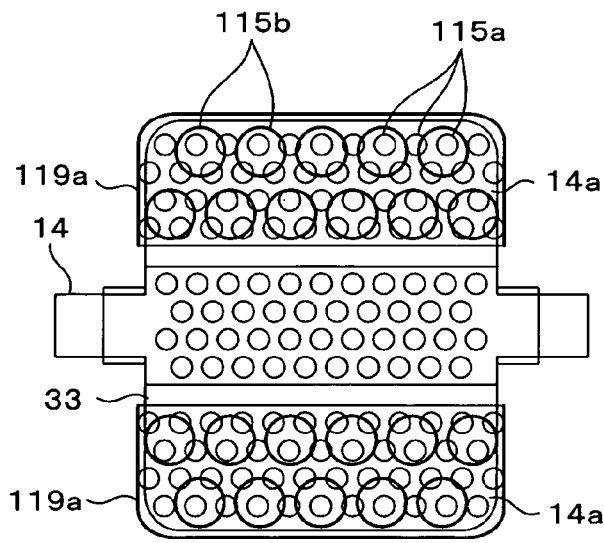 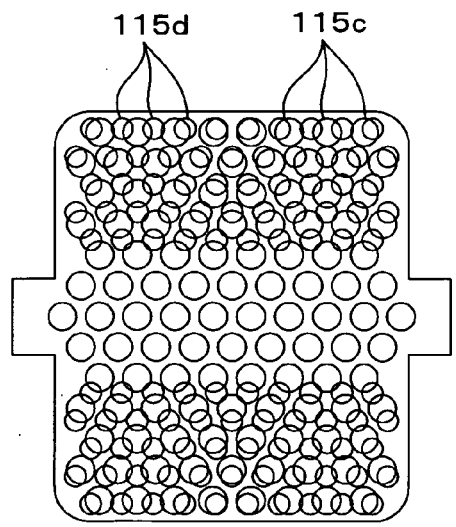

LIQUID CRYSTAL DISPLAY DEVICE

CROSS-REFERENCE TO RELATED APPLICATIONS

This application is based on and claims priority of Japanese Patent Application No. 2004-364750 filed on Dec. 16, 2004, the entire contents of which are incorporated herein by reference.

BACKGROUND OF THE INVENTION

1. Field of the Invention

The present invention relates to a reflective or transflective liquid crystal display device which displays images by using outside light, and more particularly relates to a liquid crystal display device having minute irregularities provided on a surface of a reflective film.

2. Description of the Prior Art

A liquid crystal display device has advantages that the device is thin and light and has low power consumption since the device can be driven at a low voltage. Thus, the liquid crystal display device is widely utilized in various electronic devices. Particularly, an active matrix liquid crystal display device in which a TFT (thin film transistor) is provided as a switching element for each picture element is as excellent in display quality as a CRT (cathode-ray tube). Thus, the active matrix liquid crystal display device is widely used for a display of a TV, a personal computer or the like.

A general liquid crystal display device has a structure in which liquid crystal is sealed between two substrates disposed so as to face each other. In one of the substrates, TFTs, picture element electrodes and the like are formed. In the other substrate, color filters, common electrodes and the like are formed. Hereinafter, the substrate in which the TFTs, the picture element electrodes and the like are formed is called a TFT substrate, and a substrate disposed so as to face the TFT substrate is called a counter substrate.

Liquid crystal display devices include the following three types, including: a transmission liquid crystal display device which displays images by using a backlight as a light source and using light transmitted through a liquid crystal panel; a reflective liquid crystal display device which displays images by utilizing reflection of outside light (natural light or lamplight); and a transflective liquid crystal display device which displays images by using a backlight in the dark and utilizing reflection of outside light in bright light.

The reflective liquid crystal display device requires no backlight and thus has an advantage that power consumption is lower than that of the transmission liquid crystal display device. Moreover, in a well-lighted location, the reflective liquid crystal display device or the transflective liquid crystal display device, both of which utilize outside light, can often display images better than the transmission liquid crystal display device which utilizes the backlight can.

Meanwhile, in the reflective liquid crystal display device and the transflective liquid crystal display device, if a film which reflects light (a reflective film) has a flat surface, a range within which clear images can be seen (a viewing angle) is extremely narrowed. At the same time, there occurs a problem of reflection and the like. Therefore, it is required to scatter light by providing minute irregularities on the surface of the reflective film.

There has heretofore been proposed a method for forming minute irregularities on the surface of the reflective film. For example, Japanese Patent Laid-Open No. Hei 5 (1993)-173158 describes that irregularities are formed on a surface of an organic insulating film (polyimide film) by use of a photolithography method and a dry etching method and a reflective film is formed thereon. Moreover, U.S. Pat. No. 2,990,046 describes that irregularities are formed by utilizing at least one of a metal film, an insulating film and a semiconductor film, all of which are used for forming a switching element (TFT), and a reflective film is formed thereon with an insulating film interposed therebetween.

However, the inventors of the present application consider that the conventional technologies described above have the following problems. Specifically, the technology disclosed in Japanese Patent Laid-Open No. Hei 5 (1993)-173158 requires a step of applying a photosensitive resin (photoresist) onto the organic insulating film, an exposure and development step and a dry etching step. Thus, along with an increase in the number of steps, manufacturing costs are increased and the yield is lowered.

In the technology described in U.S. Pat. No. 2,990,046, the metal film, the insulating film and the semiconductor film are laminated and etched by use of the photolithography method. Thus, the irregularities are formed simultaneously with formation of the TFT. Thereafter, an insulating film is formed on the entire surface and the reflective film is formed thereon. By forming the irregularities simultaneously with formation of the TFT as described above, an increase in the number of manufacturing steps can be avoided. However, in this technology, density of the irregularities depends on resolution of photolithography. Thus, it is difficult to form the irregularities with high density.

Moreover, in a part of the embodiment described in U.S. Pat. No. 2,990,046, a glass substrate is etched. However, if the glass substrate is etched, impurities contained in the glass substrate are eluted to contaminate liquid crystal. Thus, display quality may be significantly impaired.

SUMMARY OF THE INVENTION

Accordingly, it is an object of the present invention to provide a liquid crystal display device including a reflective film having minute and high-density irregularities on its surface.

The foregoing object is achieved by a liquid crystal display device including: a first substrate; a second substrate which is disposed so as to face the first substrate and transmits light; a reflective film which is formed on the first substrate and reflects light transmitted through the second substrate; a plurality of films laminated between the first substrate and the reflective film; and liquid crystal sealed between the first and second substrates. In the liquid crystal display device, irregularities are formed on a surface of the reflective film by openings formed in at least one of the plurality of films. Moreover, a linear density defined by a sum of peripheral dimensions of the openings per unit area is equal to 0.2 or more.

In the present invention, the openings are formed in at least one of the plurality of films laminated between the reflective film and the first substrate, and the irregularities are formed on the surface of the reflective film by the openings. The experiment and study conducted by the inventors of the present application, and the like, have revealed that, in order to obtain a reflectance required as that for a reflective liquid crystal display device, a linear density defined by peripheral dimensions of patterns (openings or island patterns) per unit area is required to be set to be equal to 0.2 or more. In the case of a novolac positive photoresist generally used in the steps of manufacturing a liquid crystal display device, entering of light occurs at the time of exposure. Thus, finished dimensions of openings are set slightly larger than mask pattern dimensions. Meanwhile, in the case where island patterns (protrusions) are formed by use of the novolac positive photoresist, finished dimensions of the island patterns are set slightly smaller than the mask pattern dimensions. Therefore, when it is assumed that the mask pattern dimensions are the same, the openings can have a linear density larger than that of the island patterns. In other words, higher-density irregularities can be formed by forming irregularities on the surface of the reflective film by the openings than by forming irregularities on the surface of the reflective film by the island patterns.

It is preferable that the second substrate includes a color filter having an opening provided in a portion facing at least a part of the reflective film, a gap adjusting film which fills in the opening of the color filter and is formed on the color filter, and an orientation control protrusion which is formed on the gap adjusting film at a position facing the center of the opening of the color filter. In the case of a transflective liquid crystal display device, light is transmitted once through the color filter in a transmission region. Meanwhile, light is transmitted twice (back and forth) through the color filter in a reflection region. Thus, there arises a difference in chromaticity between the transmission region and the reflection region. By providing the opening in a part of the color filter in the reflection region as described above, the difference in chromaticity between the transmission region and the reflection region can be reduced.

Moreover, by providing the gap adjusting film, an optical path length (round-trip optical path length) of light passing through a liquid crystal layer in the reflection region can be approximated to an optical path length of light passing through the liquid crystal layer in the transmission region. Thus, optical compensation conditions in black display can be set the same in the transmission region and the reflection region.

Furthermore, at least one of the gap adjusting film and the orientation control protrusion may contain diffusing particles which diffuse light. Thus, viewing angle characteristics in the reflection region can be improved.

BRIEF DESCRIPTION OF THE DRAWINGS

FIG. 8 is a table showing a relationship between a mask pattern dimension, a finished dimension and a linear density when circular openings are formed in a metal film and an insulating film.

FIGS. 22A to 22C are plan views showing a reflection region in a liquid crystal display device according to a fifth embodiment of the present invention.

DESCRIPTION OF THE PREFERRED EMBODIMENTS

With reference to the accompanying drawings, the present invention will be described below.

First Embodiment

Figure 1:
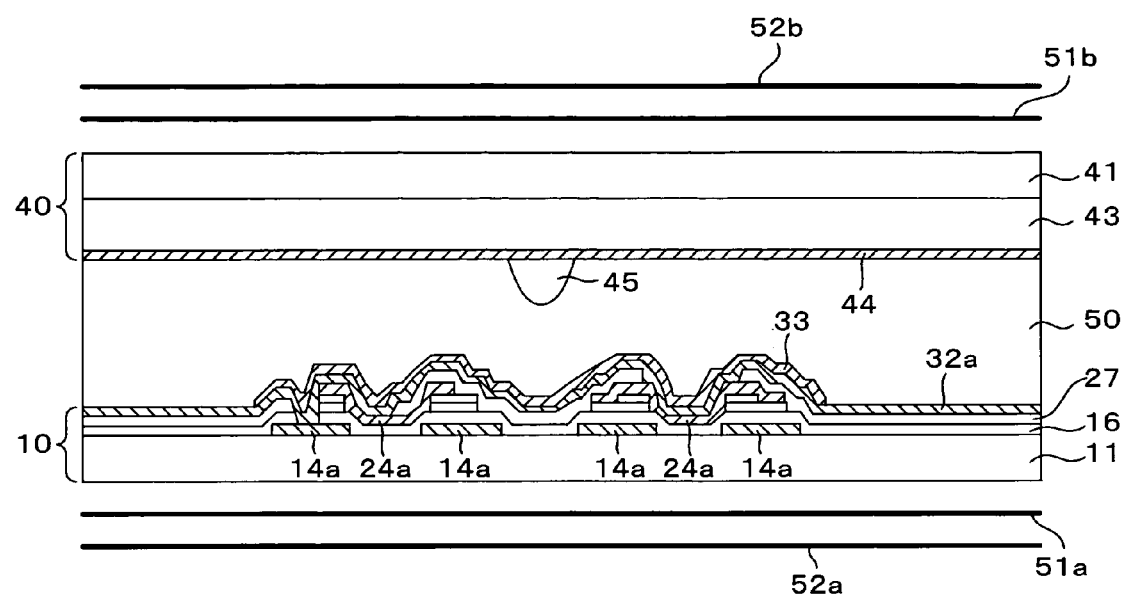
FIG. 1 is a cross-sectional view showing a liquid crystal display device according to a first embodiment of the present invention.
Figure 2:
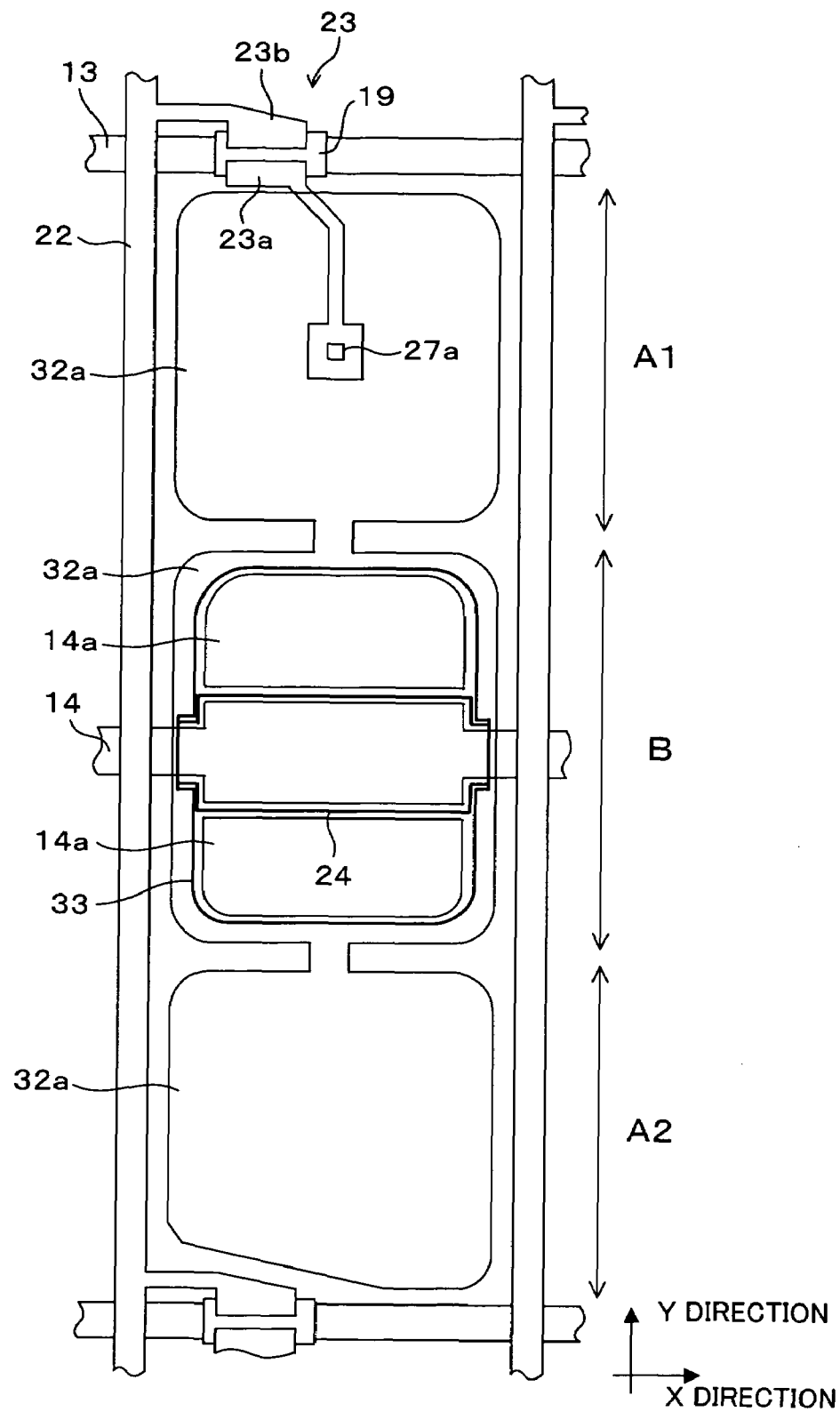
FIG. 2 is a plan view of the liquid crystal display device of the first embodiment.

FIG. 1 is a cross-sectional view schematically showing a liquid crystal display device according to a first embodiment of the present invention. FIG. 2 is a plan view showing one picture element of the liquid crystal display device. This embodiment shows an example where the present invention is applied to a transflective liquid crystal display device having channel protection type TFTs.

As shown in FIG. 1, the liquid crystal display device of this embodiment includes: a TFT substrate 10 and a counter substrate 40 which are disposed so as to face each other; and vertical orientation liquid crystal (liquid crystal having negative dielectric constant anisotropy) 50 which is sealed between the TFT substrate 10 and the counter substrate 40. A λ/4 wavelength plate (phase difference plate) 51a and a polarizing plate 52a are disposed below the TFT substrate 10, and a backlight (not shown) is disposed therebelow. Meanwhile, a λ/4 wavelength plate (phase difference plate) 51b and a polarizing plate 52b are disposed above the counter substrate 40. The λ/4 wavelength plates 51a and 51b are disposed so as to set delay phase axes to be at right angles to each other. Moreover, the polarizing plates 52a and 52b are disposed so as to set transmission axes to be at right angles to each other.

As shown in FIG. 2, in the TFT substrate 10, a plurality of gate bus lines 13 extended in an X direction (horizontal direction) and a plurality of data bus lines 22 extended in a Y direction (vertical direction) are formed. The gate bus lines 13 are arranged at a pitch of about 300 µm, for example, in the Y direction, and the data bus lines 22 are arranged at a pitch of about 100 µm, for example, in the X direction. Each of rectangular regions divided by the gate bus lines 13 and the data bus lines 22 is a picture element region.

In the TFT substrate 10, an auxiliary capacitance bus line 14 is formed, which is disposed parallel to the gate bus line 13 and crosses the center of the picture element region. A first insulating film (gate insulating film) 16 is formed between the gate bus line 13 and the auxiliary capacitance bus line 14 and the data bus line 22. The first insulating film 16 electrically insulates between the gate bus line 13 and the data bus line 22 and between the auxiliary capacitance bus line 14 and the data bus line 22.

Moreover, in the TFT substrate 10, a TFT 23 is formed for each of the picture element regions. As shown in FIG. 2, in the TFT 23, a part of the gate bus line 13 is set as a gate electrode, and a semiconductor film (not shown) which has a predetermined size and is formed on the gate bus line 13 with the first insulating film 16 interposed therebetween is set as an active layer. Moreover, a channel protection film (second insulating film) 19 is selectively formed above the gate bus line 13, and a source electrode 23a and a drain electrode 23b are disposed so as to face each other on both sides in a width direction of the gate bus line 13. The drain electrode 23b of the TFT 23 is connected to the data bus line 22.

One picture element region is divided into three regions aligned along the data bus line 22. Hereinafter, a central region among the three regions is called a reflection region B, and the two regions sandwiching the reflection region B are called a first transmission region A1 and a second transmission region A2. In the first and second transmission regions A1 and A2 and the reflection region B, transparent electrodes 32a, each having an approximately rectangular shape with curved corners, are formed, respectively. The transparent electrodes 32a are formed of transparent conductors such as ITO (indium-tin oxide) and are electrically connected to each other through connection parts which are formed simultaneously with the transparent electrodes 32a and are formed of transparent conductors.

Moreover, above or below the transparent electrode 32a in the reflection region B, a reflecting electrode (reflective film) 33 is formed, which has an approximately rectangular shape with curved corners. On a surface of the reflecting electrode 33, minute and random irregularities are formed with high density by use of a method to be described later. Furthermore, below the reflecting electrode 33, as described later, formed are: an auxiliary capacitance electrode 24 which forms an auxiliary capacitance together with the auxiliary capacitance bus line 14 and the first insulating film 16; first and second metal film patterns 14a and 24a, a semiconductor film (not shown) and a third insulating film 27, all of which have openings provided for forming the irregularities on the surface of the reflecting electrode 33; and the like.

The source electrode 23a of the TFT 23 is extended below the center of the transparent electrode 32a in the transmission region A1 and is electrically connected to the transparent electrode 32a through a contact hole 27a.

A surface of the transparent electrode 32a is covered with a vertical orientation film (not shown) which is made of polyimide, for example.

Meanwhile, as shown in FIG. 1, on one surface (lower surface in FIG. 1) of the counter substrate 40, a black matrix (not shown) and a color filter 43 are formed. The black matrix is made of a light shielding material such as Cr (chromium), for example, and is disposed at a position facing the gate bus line 13, the data bus line 22 and the TFT 23 on the TFT substrate 10. There are three kinds of color filters 43, including red, green and blue ones, and any one of the red, green and blue color filters is disposed for each picture element. In this embodiment, one pixel is formed of three, red, green and blue picture elements which are disposed so as to be adjacent to each other in the X direction.

On a surface (lower surface in FIG. 1) of the color filter 43, a common electrode 44 is formed, which is made of a transparent conductor such as ITO. On a surface (lower surface in FIG. 1) of the common electrode 44, a conical orientation control protrusion 45 is formed, which is made of a dielectric material such as a resin, for example. The orientation control protrusion 45 is disposed in each of center positions of the transmission regions A1 and A2 and the reflection region B. Moreover, surfaces of the common electrode 44 and the orientation control protrusion 45 are covered with a vertical orientation film (not shown) which is made of polyimide, for example.

Figure 3:
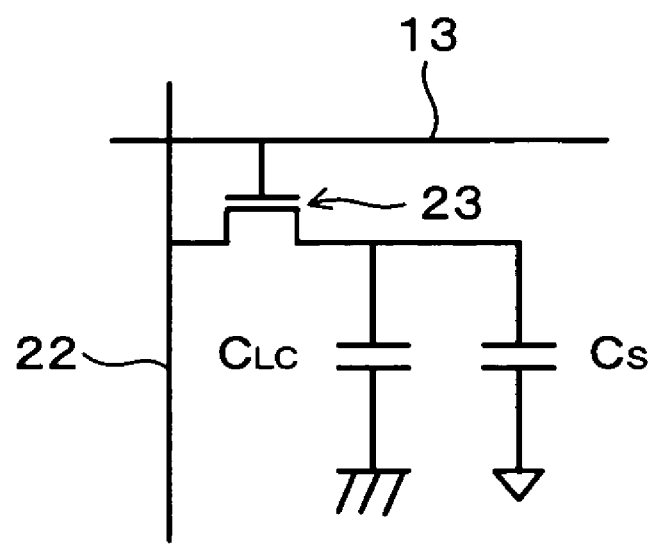
FIG. 3 is an equivalent circuit diagram of one picture element in the liquid crystal display device of the first embodiment.

FIG. 3 is an equivalent circuit diagram of one picture element in the liquid crystal display device of this embodiment. As shown in FIG. 3, an auxiliary capacitance $C_s$ formed of the auxiliary capacitance bus line 14 and the auxiliary capacitance electrode 24 is connected in parallel to a capacitance $C_{LC}$ formed of a picture element electrode (the transparent electrode 32a and the reflecting electrode 33), the common electrode 44 and the liquid crystal 50 therebetween. Accordingly, lowering of a display voltage written into the picture element electrode through the TFT 23 is suppressed.

In the liquid crystal display device of this embodiment, which is configured as described above, when the device is used in a room, the backlight disposed below the TFT substrate 10 is turned on and images are displayed by use of light transmitted through a liquid crystal panel. Moreover, when the device is used in bright light, the backlight is turned off and images are displayed by use of light reflected by the reflecting electrode 33. In this case, since the minute irregularities are formed with high density on the surface of the reflecting electrode 33, good viewing angle characteristics are achieved. Thus, it is possible to view clear images in a relatively wide range.

In this embodiment, the irregularities are formed on the surface of the reflecting electrode 33 by forming circular or polygonal openings in at least one of the metal film, the insulating film and the semiconductor film, which films are below the reflecting electrode 33. In this event, a linear density defined by a sum of peripheral portion dimensions of the openings existing in a triangle consisting of lines connecting respectively center points of the adjacent three openings, in other words, a sum of peripheral portion dimensions of the openings per area of the triangle (unit area) is assumed to be equal to 0.2 or more. The experiment and study conducted by the inventors of the present application have revealed that, as described later, the linear density and the reflectance are closely related to each other and good reflection characteristics can be obtained by setting the linear density to be equal to 0.2 or more.

It is preferable that, when it is assumed that a diameter or a full width of each opening is S and an interval between the openings is L, the openings are disposed so as to set an L/S value to be equal to 1 or less. Thus, the linear density of the openings is increased, and the irregularities formed on the reflecting electrode 33 are more densely formed.

Figure 4A:
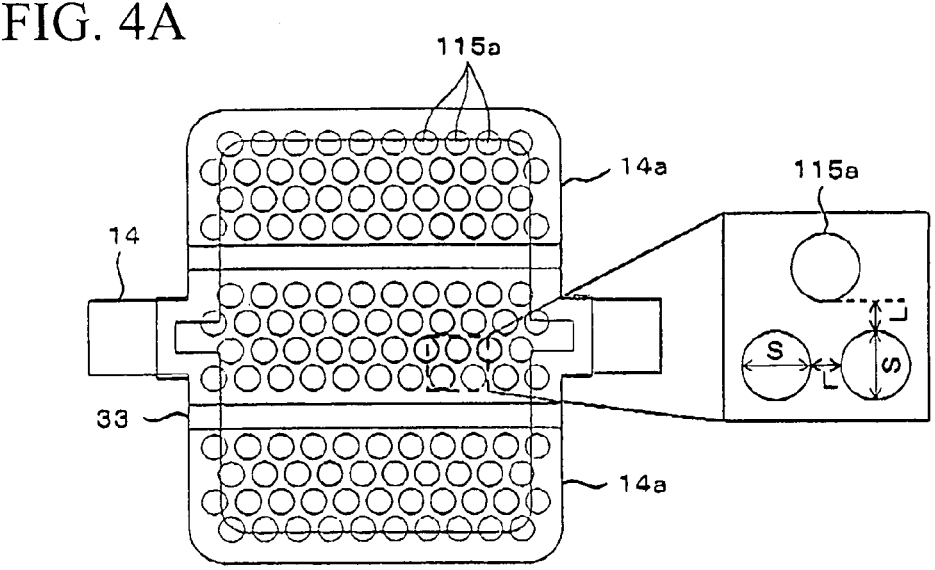
FIGS. 4A and 4B are plan views showing a reflection region in the liquid crystal display device according to the first embodiment of the present invention.
Figure 4B:
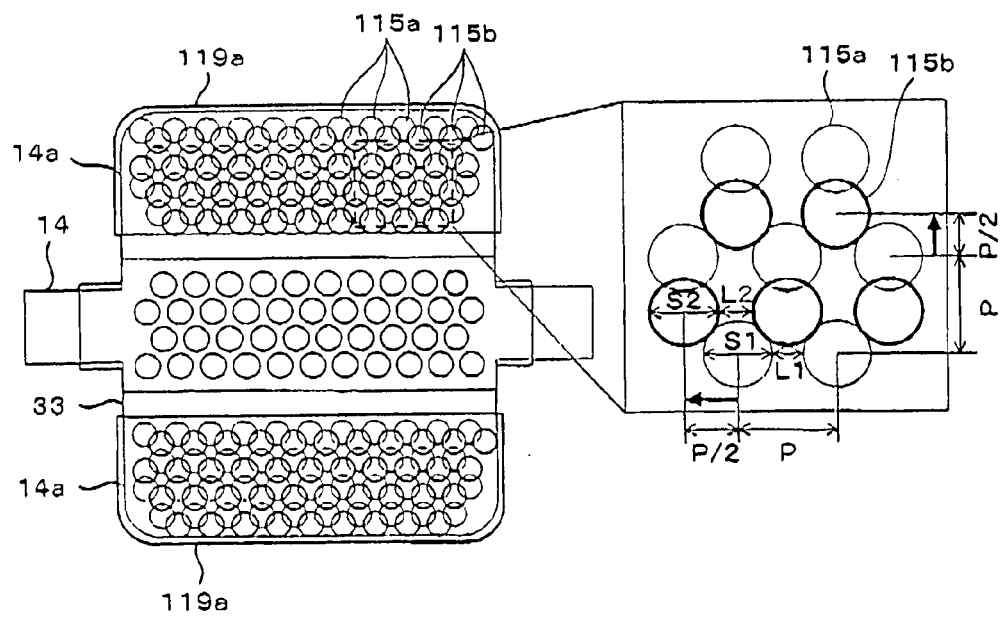

FIGS. 4A and 4B are plan views showing the reflection region B in the liquid crystal display device of this embodiment. In this embodiment, the irregularities are formed on the surface of the reflecting electrode by forming the openings (opening patterns) in the film below the reflecting electrode 33. At the same time, the linear density defined by the sum of peripheral portion dimensions of the openings per unit area is set to be equal to 0.2 or more. Thus, efficiency of using light reflected by the reflecting electrode (reflective film) is optimized.

FIG. 4A shows an example in the case where a plurality of openings 115a, each having the diameter S, are disposed with the intervals L in a wide portion of the auxiliary capacitance bus line 14 formed below the reflecting electrode 33 and the first metal film pattern 14a disposed on both sides in a width direction of the auxiliary capacitance bus line 14.

In the case where openings are formed in two or more films, respectively, for example, the same linear density and L/S value are set for the openings in the respective films. Moreover, the openings in the respective films are arranged by being shifted by a ½ pitch. Thus, overlaps between the openings in the respective films are minimized, and the linear density can be maximized. FIG. 4B shows an example where openings 115b, each having the diameter S, are also disposed in an insulating film pattern 119a (the second insulating film) on the first metal film pattern 14a shown in FIG. 4A, the openings 115b being shifted from the openings 115a by a ½ pitch (P/2).

Figure 5A:
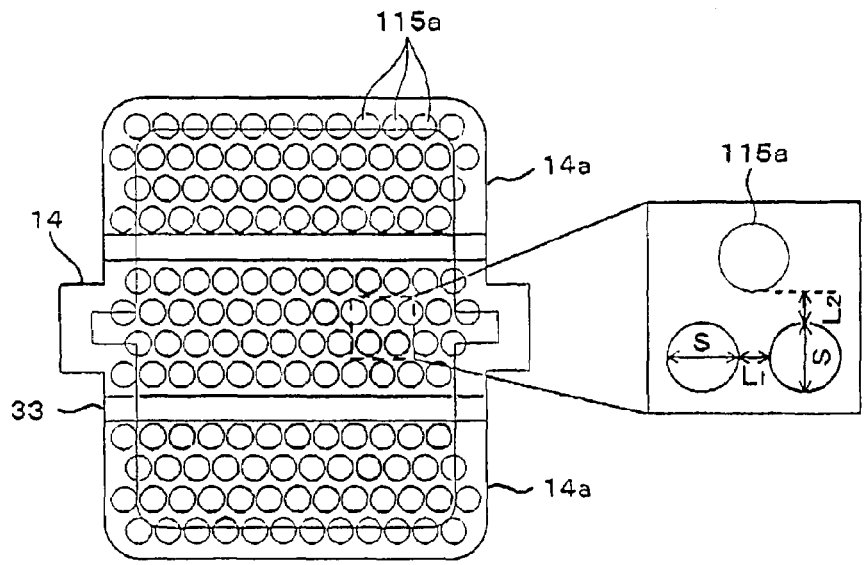
FIG. 5A is a schematic view showing an example where openings are arranged in such a manner that an L/S value in a lateral direction is different from an L/S value in an oblique direction by setting an interval in the lateral direction to be smaller than an interval in the oblique direction.

Moreover, in order to increase the linear density, it is fundamental to arrange the openings in such a manner that a line connecting center points of the respective openings draws a triangle. However, an L/S value in a direction parallel to a specific side of the triangle may be set smaller than an L/S value in a direction parallel to other sides. Thus, light can be preferentially reflected in a specific direction. As a result, display performance of the liquid crystal display device in the specific direction is improved. FIG. 5A shows an example where the openings 115a are arranged in such a manner that an L/S value in a lateral direction (a direction parallel to the gate bus line) is different from an L/S value in a longitudinal direction (a direction parallel to the data bus line) by setting an interval L1 in the lateral direction to be smaller than an interval L2 in the longitudinal direction.

Figure 5B:
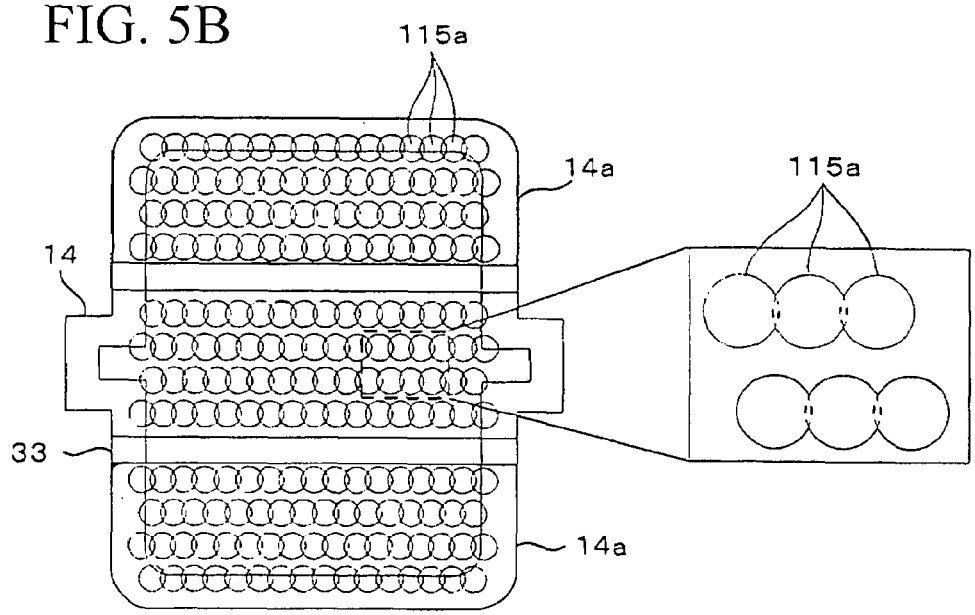
FIG. 5B is a schematic view showing an example where the openings arranged in the lateral direction partially overlap with each other.

The display performance in the specific direction can be similarly improved also by arranging the circular or polygonal openings aligned in one direction in such a manner that the openings partially overlap with each other (in other words, the openings are connected to each other). FIG. 5B shows an example where the openings 115a arranged in the lateral direction partially overlap with each other.

Figure 6:
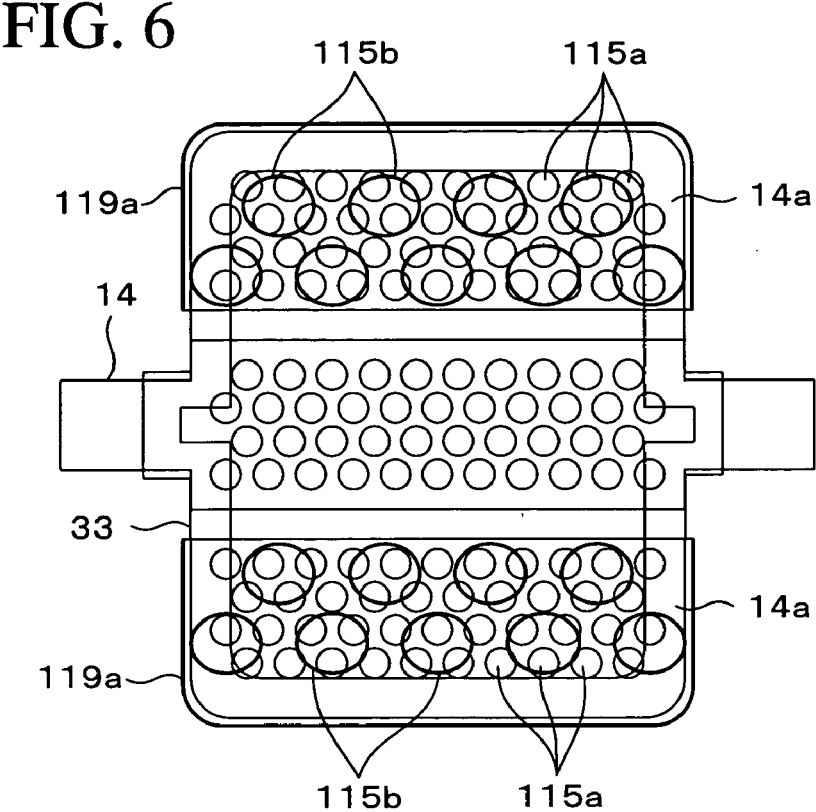
FIG. 6 is a schematic view showing an example where openings formed in an insulating film pattern are made larger than openings formed in a first metal film pattern.

Furthermore, the size of the openings in one film may be different from the size of the openings in the other film. However, it is important that the linear density defined by the sum of peripheral portion dimensions of the openings per unit area is equal to 0.2 or more, in at least one of the films. FIG. 6 shows an example where the openings 115b formed in the insulating film pattern 119a are made larger than the openings 115a formed in the first metal film pattern 14a.

The liquid crystal display device of this embodiment will be concretely described below.

FIGS. 7A to 7F are cross-sectional views showing a method for manufacturing the liquid crystal display device having the reflecting electrode shown in FIG. 6 in the order of steps.

Figure 7A:
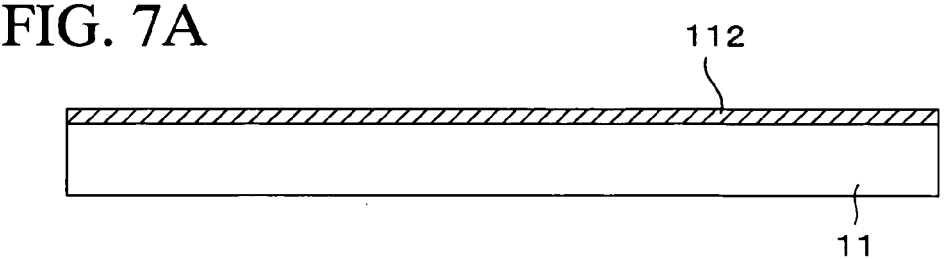
FIGS. 7A to 7F are cross-sectional views showing a method for manufacturing the liquid crystal display device of the first embodiment.
Figure 7B:
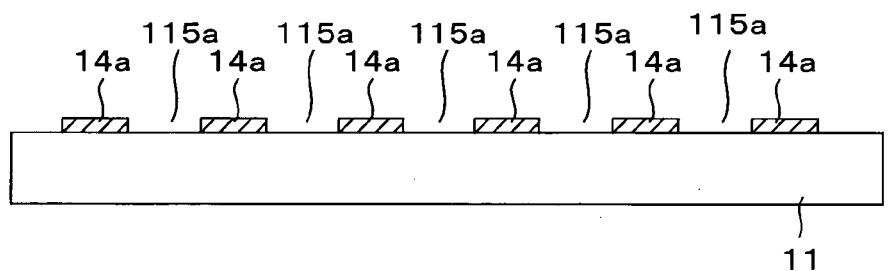

First, as shown in FIG. 7A, on a glass substrate 11 to be a base of a TFT substrate 10, a first metal film 112 having a three-layer structure of Al/MoN/Mo, for example, is formed. Thereafter, as shown in FIG. 7B and FIG. 6, the first metal film 112 is patterned by use of a photolithography method to form gate bus lines 13 and auxiliary capacitance bus lines 14. At the same time, first metal film patterns 14a are formed, respectively, at positions sandwiching the auxiliary capacitance bus lines 14 from both sides in a width direction thereof.

In this event, as shown in FIG. 6, a plurality of circular openings 115a are formed in wide portions of the auxiliary capacitance bus lines 14 and the first metal film patterns 14a. For example, a diameter S of each of the openings 115a is set to be 4 μm, and an interval L therebetween is set to 1.75 μm. Moreover, the openings 115a are arranged in such a manner that a line connecting center points of the respective openings 115a draws a triangle. In this case, an L/S value is set to 0.44.

Figure 7C:
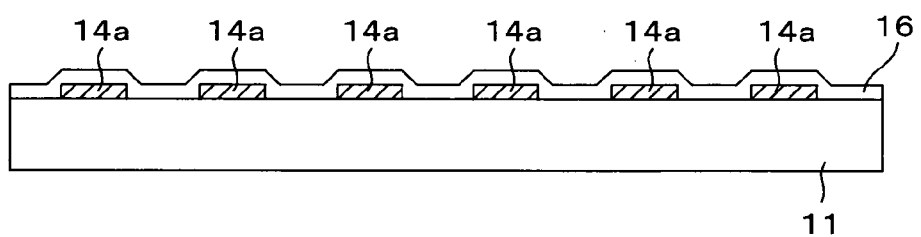
Figure 7D:
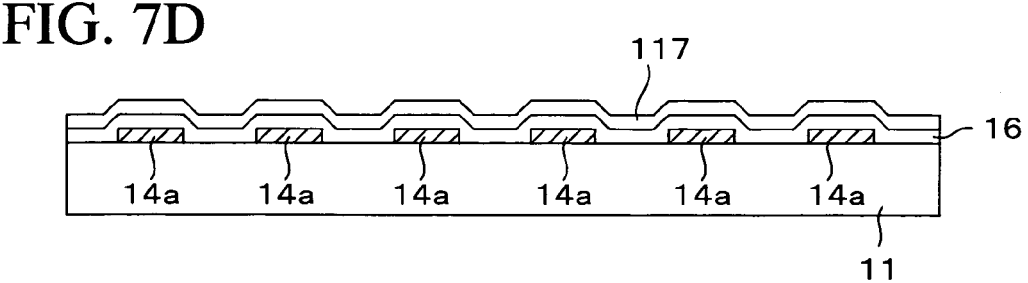
Figure 7E:
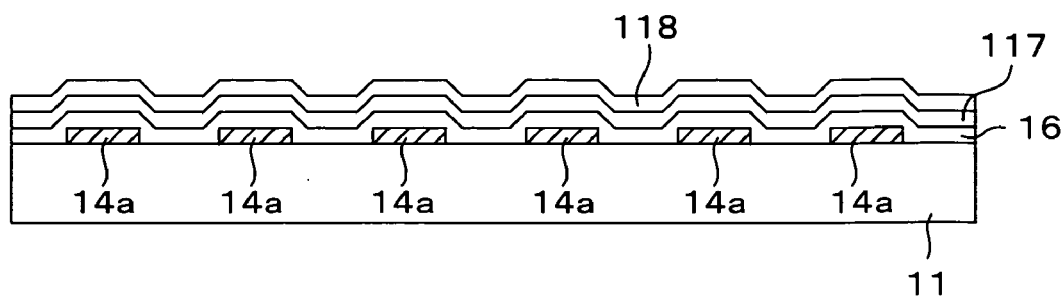
Figure 7F:
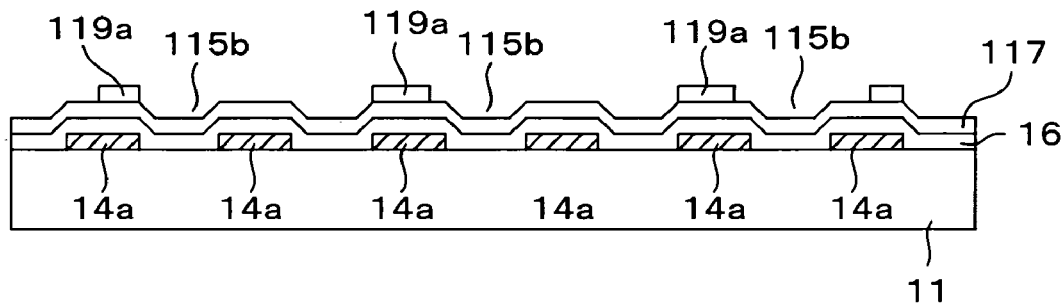

Next, as shown in FIG. 7C, a first insulating film (gate insulating film) 16 made of SiN, for example, is formed on the entire upper surface of the glass substrate 11. Thereafter, as shown in FIG. 7D, on the first insulating film 16, a first semiconductor film 117 made of amorphous silicon is formed, for example, by use of a CVD method. Subsequently, as shown in FIG. 7E and FIG. 6, a second insulating film 118 made of SiN, for example, is formed. Thereafter, the second insulating film 118 is patterned by use of the photolithography method to form a channel protection film 19. Moreover, as shown in FIG. 7F, insulating film patterns 119a are formed above the first metal film patterns 14a.

In the insulating film patterns 119a, a plurality of openings 115b are formed. Specifically, each of the openings 115b has a diameter S of 9 μm and an interval L therebetween is 5 μm, for example. The openings 115b are arranged in such a manner that a line connecting center points of the respective openings draws a triangle. In this case, an L/S value is set to 0.56.

Thereafter, a second semiconductor film to be an ohmic contact layer is formed to have a thickness of 30 nm, for example, on the entire upper surface of the glass substrate 11, the second semiconductor film being made of high-density n-type impurity amorphous silicon. Subsequently, a second metal film made of Ti/Al/Ti, for example, is formed on the second semiconductor film. Thereafter, the second metal film is patterned by use of the photolithography method to simultaneously form data bus lines 22, source and drain electrodes 23a and 23b of TFTs 23 and auxiliary capacitance electrodes 24. A width of the data bus line 22 is set to 7 μm, for example. Moreover, as shown in FIG. 2, the source electrode 23a is extended to a center portion of a first transmission region A1 and has a square connection part having sides of 15 μm, for example, which connection part is formed on its tip.

Next, a third insulating film 27 made of SiN, for example, is formed to have a thickness of about 330 nm on the entire upper surface of the glass substrate 11. The third insulating film 27 covers the data bus lines 22, the TFTs 23 and the auxiliary capacitance electrodes 24. Thereafter, by use of the photolithography method, a contact hole 27a which leads to the connection part of the source electrode 23a is formed in the third insulating film 27.

Next, a third metal film is formed on the entire upper surface of the glass substrate 11. Thereafter, the third metal film is patterned to form a reflecting electrode 33 in a reflection region B.

On a surface of the reflecting electrode 33, irregularities are densely formed by the openings 115a in the wide portions of the auxiliary capacitance bus lines 14 and the first metal film patterns 14a and by the openings 115b in the insulating film patterns 119a.

Next, a fourth metal film is formed by use of a transparent conductor such as ITO on the entire upper surface of the glass substrate 11. A thickness of the fourth metal film is set to, for example, 70 nm. Thereafter, the fourth metal film is patterned to form a transparent electrode 32a. Furthermore, polyimide is applied onto the transparent electrode 32a to form a vertical orientation film.

Thus, the TFT substrate 10 is completed. Note that, in the above description, the transparent electrode 32a is formed on the reflecting electrode 33. However, the reflecting electrode 33 may be formed on the transparent electrode 32a.

With reference to FIG. 1, a method for manufacturing the counter substrate 40 will be described below.

First, a metal film such as Cr, for example, is formed on a surface (lower surface in FIG. 1) of a glass substrate 41 to be a base of the counter substrate 40. Thereafter, the metal film is patterned to form a black matrix. Subsequently, red, green and blue color filters 43 are formed by use of a red photosensitive resin, a green photosensitive resin and a blue photosensitive resin. Note that the black matrix may be formed by use of a black resin or may be formed by superimposing two or more color filters among the red, green and blue color filters.

Next, a transparent conductor such as ITO, for example, is sputtered on the entire upper surface of the glass substrate to form a common electrode 44. Thereafter, a photosensitive resin is applied onto the common electrode 44, and exposure and development processing is performed to form an orientation control protrusion 45. The orientation control protrusion 45 is formed at each of center positions of the transmission regions A1 and A2 and the reflection region B. The orientation control protrusion 45 has a diameter of 10 µm and a height of 2.5 µm, for example.

Next, polyimide, for example, is applied onto surfaces of the common electrode 44 and the orientation control protrusion 45 to form a vertical orientation film (not shown). Thus, the counter substrate 40 is completed.

After the TFT substrate 10 and the counter substrate 40 are formed as described above, liquid crystal 50 having negative (Δε<0) dielectric constant anisotropy is sealed between the TFT substrate 10 and the counter substrate 40 by use of a vacuum injection method or a drop injection method. Thus, a liquid crystal panel is formed. Thereafter, λ/4 wavelength plates 51a and 51b and polarizing plates 52a and 52b are disposed, respectively, on both surfaces of the liquid crystal panel, and a backlight unit is attached thereto. Thus, the liquid crystal display device of this embodiment is completed.

In this embodiment, as described above, the irregularities on the surface of the reflecting electrode 33 are formed by the openings 115a in the wide portions of the auxiliary capacitance bus lines 14 and the first metal film patterns 14a disposed on both sides in the width direction thereof and by the openings 115b in the insulating film patterns 119a. Moreover, the linear density is set to be equal to 0.2 or more for both of the openings 115a and 115b. The reason for determining the sizes and the linear density of the openings 115a and 115b as described above will be described below.

In this embodiment, the diameter S of each of the openings 115a is set to 4 µm and the interval L therebetween is set to 1.75 µm, and the diameter S of each of the openings 115b is set to 9 µm and the interval L therebetween is set to 5 µm. Since dimensional accuracy is required for patterning of the first metal film 112, a stepper exposure method using a reticle mask is used. Meanwhile, since dimensional accuracy is not required for patterning of the second insulating film 118, a proximity exposure method using a large-sized mask is used. A resolution (exposure critical dimension) of stepper exposure is about 2.75 to 3 µm, and a resolution of proximity exposure is about 7 µm.

Meanwhile, in manufacturing of the liquid crystal display device, a novolac positive photoresist is generally used. By use of the positive photoresist, an exposed portion is removed by development. Since entering of light occurs at the time of exposure, a finished dimension of openings is made slightly larger than a mask pattern dimension. In this embodiment, a diameter Sm of each of patterns (circular patterns corresponding to the openings) of the reticle mask used in the formation of the openings 115a is set to 3 µm, and an interval Lm therebetween is set to 2.75 µm. Therefore, a finished dimension S of the openings 115a is larger than the diameter Sm of the mask patterns by 1 µm, and the interval L between the openings 115a is smaller than the interval Lm between the mask patterns by 1 µm.

Meanwhile, a diameter Sm of each of mask patterns of the large-sized mask used in the formation of the openings 115b is set to 7 µm, and an interval Lm therebetween is set to 7 µm. Therefore, a finished dimension S of the openings 115b is larger than the diameter Sm of the mask patterns by 2 µm, and the interval L between the openings 115b is smaller than the interval Lm between the mask patterns by 2 µm.

A difference in dimensions between the openings and the mask patterns mainly depends on a thickness of a film to be patterned. In the case of the example described above, a difference between the finished dimension of the openings and the mask pattern dimension in the thin metal film is 1 µm, and a difference between the finished dimension of the openings and the mask pattern dimension in the thick insulating film is 2 µm. FIG. 8 shows a relationship between a mask pattern dimension, a finished dimension and a linear density when circular openings are formed in the metal film and the insulating film.

Note that, in FIG. 8, a G layer indicates a metal film (the first metal film) for formation of the gate bus lines, an I layer indicates a metal film (the second metal film) for formation of the data bus lines and the source and drain electrodes, a SA layer indicates an insulating film (the second insulating film) for formation of the channel protection film, and a C layer indicates an insulating film (the third insulating film) for formation of a final protective film. Moreover, a thickness of each of the G and I layers (the first and second metal films) is set to 0.1 µm, and openings are formed by use of the stepper exposure method using the reticle mask in both of the layers. Furthermore, a thickness of the SA layer (the second insulating film) is set to 0.3 to 0.4 µm, and openings are formed in the layer by use of the proximity exposure method using the large-sized mask. Furthermore, a thickness of the C layer (the third insulating film) is set to 0.3 to 0.4 µm, and openings are formed in the layer by use of the stepper exposure method using the reticle mask. Furthermore, S indicates a diameter (a finished dimension) of the openings, L indicates an interval (a finished dimension) between the openings, Sm indicates a diameter of mask patterns (circular patterns corresponding to the openings), and Lm indicates an interval between the mask patterns. Moreover, for reference, FIG. 8 also shows a linear density when circular protrusions (island patterns) are formed instead of the circular openings. In this case, a light shielding part and a transmission part are merely reversed compared with the case of the mask for forming the openings. Therefore, the size of the mask patterns is set the same.

Figure 23A:
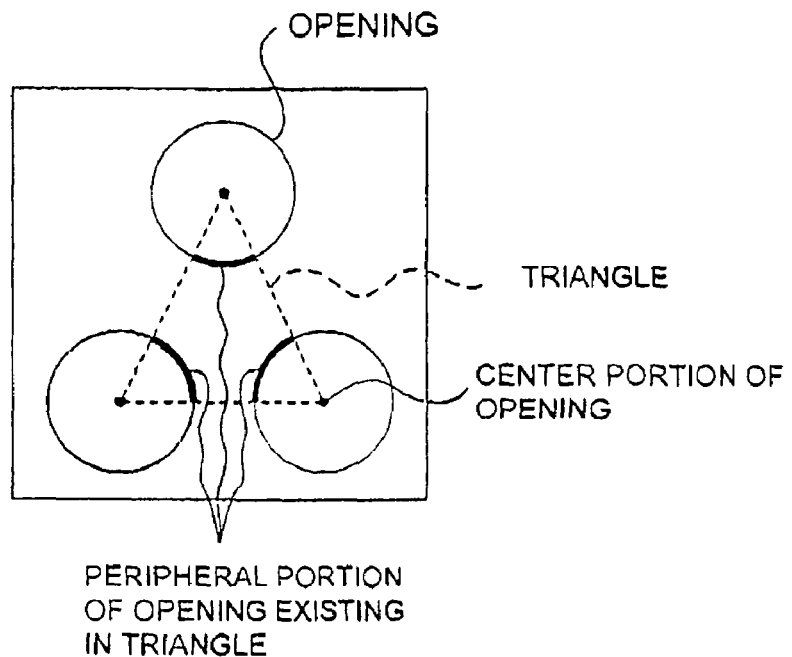
FIGS. 23A and 23B are plan views showing an expanded portion of the reflection region B in the liquid crystal display device according to an embodiment.
Figure 23B:
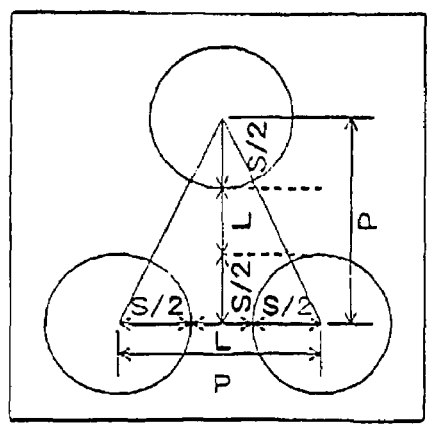

For example, in the case a plurality of openings 115a, which have a diameter S of 4 microns and an interval L of 1.75 microns, are formed in the wide portions of the auxiliary capacitance bus lines 14 and the first metal film patterns 14a, which are formed by patterning the first metal film 112, the linear density is calculated as the following (see FIGS. 23A and 23B.

It is noted that adjacent three openings out of a plurality of openings formed in a film (e.g., a metal film, an insulating film and a semiconductor film) are depicted in FIGS. 23A and 23B. In said Figures, a triangle consisting of lines connecting respectively center points of adjacent three openings is depicted by a dashed line, and each of the peripheral portions of openings existing in the triangle is depicted by a thick solid line.

Calculation of the area of the triangle
=(the base)×(the height)×(1/2)
={(S/2)+L+(S/2)}×{(S/2)+L+(S/2)}×(1/2)
={(4/2)+1.75+(4/2)}×{(4/2)+1.75+(4/2)}×(1/2)
=16.53≈16.53

Calculation of peripheral portion dimensions of the openings per area of the triangle
=(the diameter)×π×(180° (i.e., the sum of internal angles of the triangle)/360°)
=S×3.14×(1/2)
=4×3.14×0.5
=6.28

Calculation of linear density
=(the sum of the peripheral portion dimensions of the openings per area of the triangle)/(the area of the triangle)
=6.28/16.53
=0.3799≈0.380

The value of the linear density (i.e., 0.380) calculated herewith coincides with the value of linear density (i.e., 0.380) in the case openings, which have a finished diameter S of 4 microns and a finished interval L of 1.75 microns, are formed in the G layer (i.e., the metal film for formation of the gate bus lines, or the first metal film), as depicted in FIG. 8.

Moreover, in the case a plurality of openings 115b, which have a diameter S of 9 microns and an interval L of 5 microns, are formed in the insulating film patterns 119a, which are formed by patterning the second insulating film 118, the linear density is calculated as the following (see FIGS. 23A and 23B.

Calculation of the area of the triangle
=(the base)×(the height)×(1/2)
={(S/2)+L+(S/2)}×{(S/2)+L+(S/2)}×(1/2)
×{(9/2)+5+(9/2)}×{(9/2)+5+(9/2)}×(1/2)
=98

Calculation of peripheral portion dimensions of the openings per area of the triangle
=(the diameter)×π×(180° (i.e., the sum of internal angles of the triangle)/360°)
=S×3.14×(1/2)
=9×3.14×0.5
=14.13

Calculation of linear density
=(the sum of the peripheral portion dimensions of the openings per area of the triangle)/(the area of the triangle)
=14.13/98
=0.1441≈0.144

The value of the linear density (i.e., 0.144) calculated herewith coincides with the value of linear density (i.e., 0.144) in the case openings, which have a finished diameter S of 9 microns and a finished interval L of 5 microns, are formed in the SA layer (i.e., the insulating film for formation of the channel protection film, or the second insulating film), as depicted in FIG. 8.

As is clear from FIG. 8, the smaller the L and S values are, the larger the linear densities of the openings and the protrusions. Moreover, the linear density can be increased by use of the stepper exposure having a high resolution compared with the proximity exposure having a low resolution.

Moreover, as described above, the finished dimension S of the openings is set larger than the mask pattern dimension Sm by 1 to 2 μm. Meanwhile, the finished dimension S of the protrusions is set smaller than the mask pattern dimension Sm by 1 to 2 μm. Thus, it is understood that, in the case of the same mask pattern dimension, the openings have a linear density larger than that of the protrusions. Specifically, the irregularities can be more densely formed by forming the irregularities on the surface of the reflecting electrode by the openings than by forming the irregularities on the surface of the reflecting electrode by the protrusions.

In the example described above, the diameter Sm of the patterns of the reticle mask for forming the openings 115a is set to 3 μm and the interval Lm is set to 2.75 μm. The above dimensions are adopted because a process margin is increased compared with the case where the diameter Sm of the mask patterns and the interval Lm therebetween are both set to 2.75 μm, and lowering of the linear density is relatively small.

Hereinafter, description will be given of results obtained by examining reflection characteristics after the liquid crystal display device according to this embodiment is actually manufactured.

FIGS. 9A to 9D are plan views, each showing the reflection region in the liquid crystal display device according to this embodiment. In all of the liquid crystal display devices, the openings 115a and 115b are formed in the first metal film pattern 14a (the G layer) and the insulating film pattern 119a (the SA layer) thereon, and the irregularities are densely formed on the surface of the reflecting electrode 33 by the openings 115a and 115b.

Figure 9A:
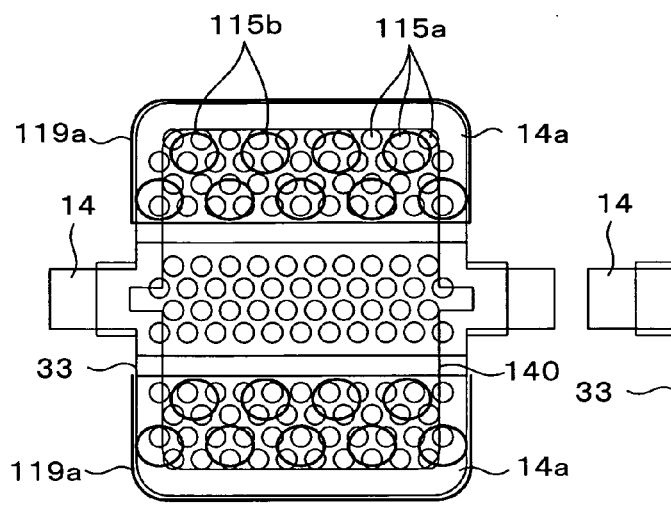
FIGS. 9A to 9D are plan views of the reflection region in the liquid crystal display device according to the first embodiment, respectively.

In the liquid crystal display device (example 1) shown in FIG. 9A, the openings 115a and 115b are arranged in such a manner that a line connecting center points of the respective openings draws a triangle. Note that the diameter of the openings 115a and the interval therebetween are set smaller than the diameter of the openings 115b and the interval therebetween.

Figure 9B:
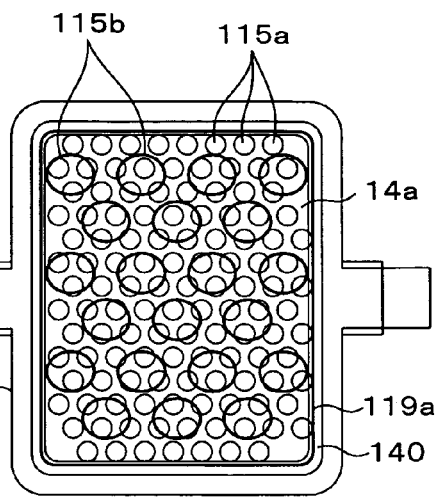

In the liquid crystal display device (example 2) shown in FIG. 9B, the openings 115a and 115b are also arranged in such a manner that a line connecting center points of the respective openings draws a triangle. Moreover, the diameter of the openings 115a and the interval therebetween are set smaller than the diameter of the openings 115b and the interval therebetween. Note that, in the liquid crystal display device of example 2, an electrode included in an auxiliary capacitance (a part of the auxiliary capacitance bus lines 14) is disposed around the first metal film pattern 14a. This is in order to prevent an area of an auxiliary capacitance electrode (in other words, a capacitance value of the auxiliary capacitance) from fluctuating even if the dimension of the openings 115a is changed. The auxiliary capacitance is formed of a part (ring-shaped portion) of the auxiliary capacitance bus lines 14 and a portion facing the part (ring-shaped portion) of the auxiliary capacitance bus lines 14 across the first insulating film in the reflecting electrode 33.

Figure 9C:
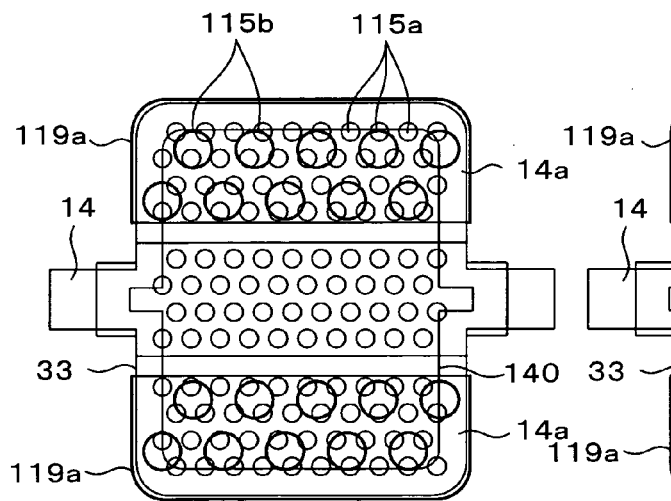

In the liquid crystal display device (example 3) shown in FIG. 9C, an L/S value in the lateral direction is set to 0.25 (=1.0 μm/4.0 μm), and an L/S value in another direction is set to 0.44 (=1.75 μm/4.0 μm).

Figure 9D:
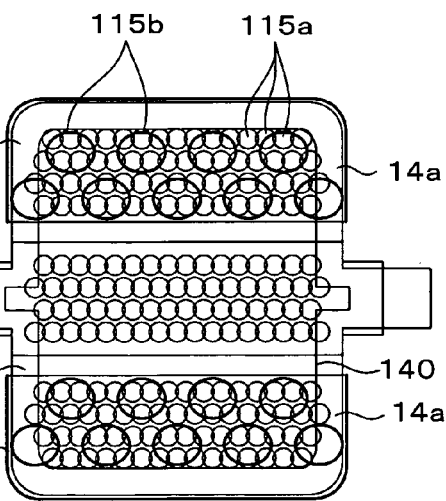

In the liquid crystal display device (example 4) shown in FIG. 9D, an L/S value in the lateral direction is set to −0.25 (=−1.0 μm/4.0 μm), and an L/S value in another direction is set to 0.44 (=1.75 μm/4.0 μm). Moreover, the openings 115a are arranged in such a manner that the openings aligned in the lateral direction partially overlap with each other (in other words, the openings are connected to each other in the lateral direction). Furthermore, the openings 115b in the insulating film patterns 119a are arranged in such a manner that a line connecting center points of the respective openings draws a triangle.

Note that the reflecting electrode 33 is formed by patterning a metal film made of Al/Ti or Al/Mo, and when a Ti or Mo film is formed on its surface, a reflectance is significantly lowered. Thus, an Al film is exposed by removing the Ti or Mo film inside a boundary line 140 shown in each of FIGS. 9A to 9D, and a transparent electrode made of ITO is formed thereon. When an ITO film (the transparent electrode 32a) is formed on the Al film, the reflectance is slightly lowered compared with the case where only the Al film is formed. However, if no ITO film is formed, due to a difference in electronegativity (ionization tendency) between an ITO film (the common electrode) on the counter substrate and the Al film on the TFT substrate, bias of charges occurs when the liquid crystal display device is used. Thus, reliability is lowered. Therefore, it is preferable that a film made of a transparent conductor such as ITO is formed on the Al film.

Figure 10:
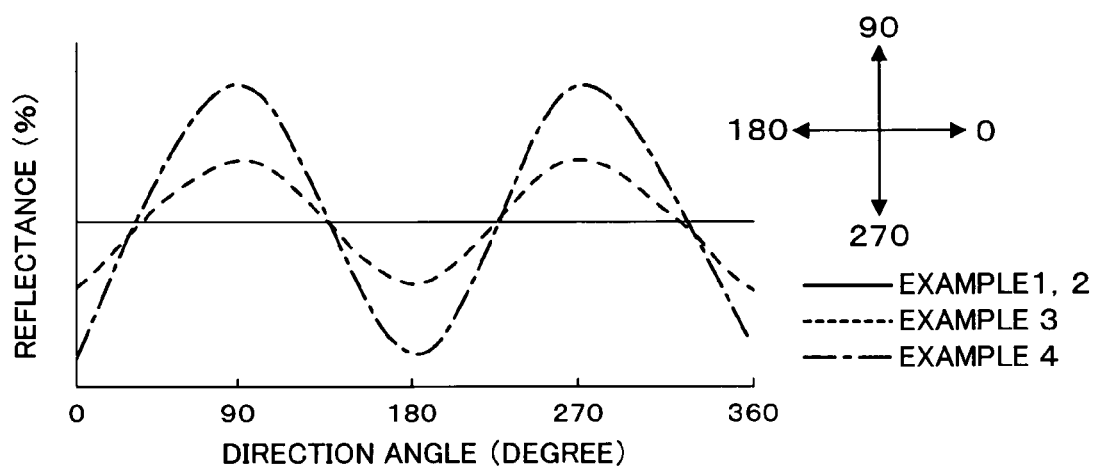
FIG. 10 is a graph showing a reflectance of reflecting electrodes shown in FIGS. 9A to 9D.

The reflectance in the reflecting electrode on the TFT substrate of each of examples 1 to 4 described above was measured. Note that light was set to be made incident on a normal to the TFT substrate at an angle of 25° from above. Moreover, right, up, left and down directions of the substrate surface were defined as 0°, 90°, 180° and 270° directions, respectively. Accordingly, reflectances in the all directions were measured by setting constant an angle of an observation direction with respect to the substrate normal. FIG. 10 shows results thereof.

As is clear from FIG. 10, the reflectances were approximately constant in the all directions in examples 1 and 2. Meanwhile, in examples 3 and 4, the reflectances were high in the 90° and 270° directions and the reflectances were low in the 0° and 180° directions. Thus, it was able to be confirmed that light can be preferentially reflected in specific directions in examples 3 and 4. The structures shown in examples 3 and 4 will be effective means for improving display characteristics in the case where the direction of viewing the liquid crystal panel is limited to the vicinity of 90° or 270°. Moreover, the L/S value of the openings in the lateral (horizontal) direction is reduced in example 3, and the openings are connected in the lateral direction in example 4. Meanwhile, in the case where the reflectances in the 0° and 180° directions are increased, an L/S value in a longitudinal (vertical) direction may be reduced or the openings may be connected in the longitudinal direction.

Note that it is also conceivable that rod-shaped openings extended in the lateral direction are formed instead of the circular or polygonal openings. However, in such a case, not only there occurs metallic display due to a too high reflectance when the viewing direction is 90° or 270° but also it becomes hard to view a screen since only a slight shift of the viewing direction from 90° or 270° significantly lowers the reflectance. Therefore, it is preferable that the shape of the openings is circular or polygonal.

Figure 11:
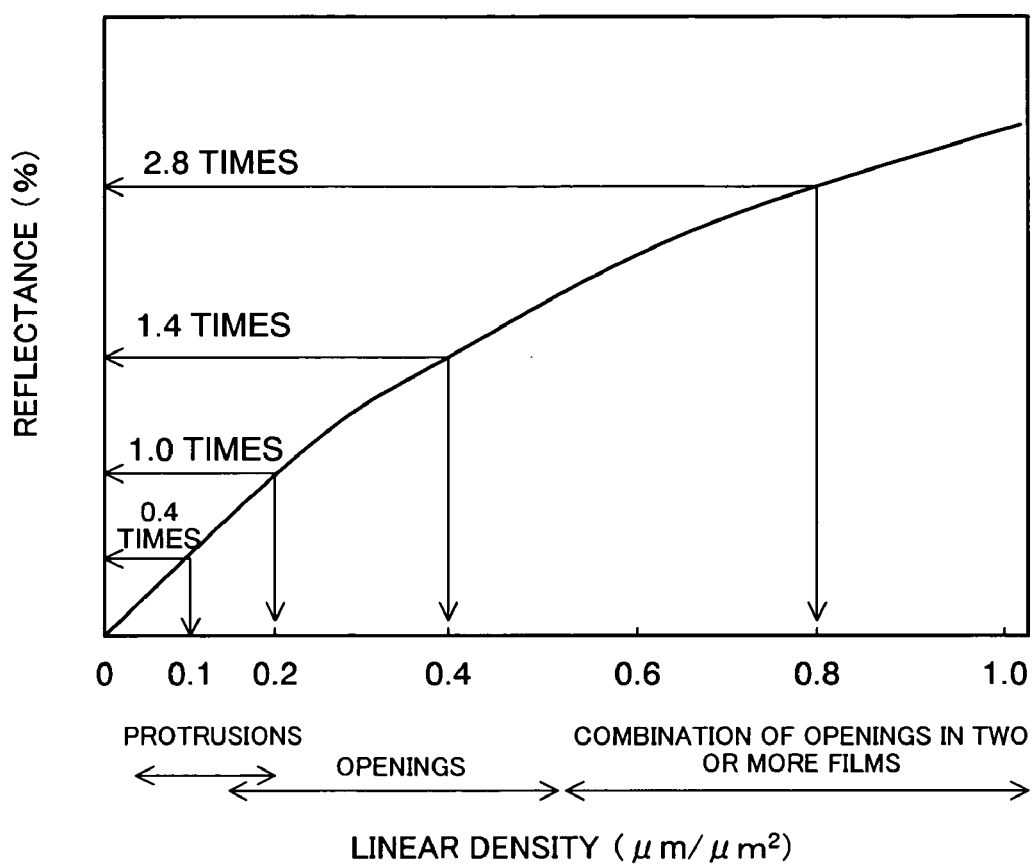
FIG. 11 is a graph showing a relationship between the linear density and the reflectance.

FIG. 11 shows a relationship between the linear density and the reflectance. FIG. 11 is a graph obtained by plotting the relationship between the linear density and the reflectance in the following manner. Specifically, circular openings (opening patterns) and protrusions (island patterns) which have the sizes shown in FIG. 8 were formed in the TFT substrate with the same arrangement as that of example 1 shown in FIG. 9A, and the reflectance was measured. The linear density of the openings was approximately equal to 0.2 or more, and the linear density of the protrusions was less than 0.2. From the measurement of the reflectance, it was found out that, even if the mask dimension is set the same, the reflectance of the openings is 3 times or more at a maximum as large as that of the protrusions. Thus, it was determined that, in order to effectively improve the reflectance of the liquid crystal panel, it is important to form the irregularities by the opening patterns and to set the linear density to be equal to 0.2 or more. Moreover, it was found out that it is difficult to set the linear density to be equal to 0.2 or more by the protrusions. Furthermore, it was found out that, in the case of the openings, it is easy to set the linear density to be equal to 0.2 or more when the L/S value is set to be equal to 1 or less, and the linear density is further increased by forming the openings in two or more films, respectively.

Figure 12A:
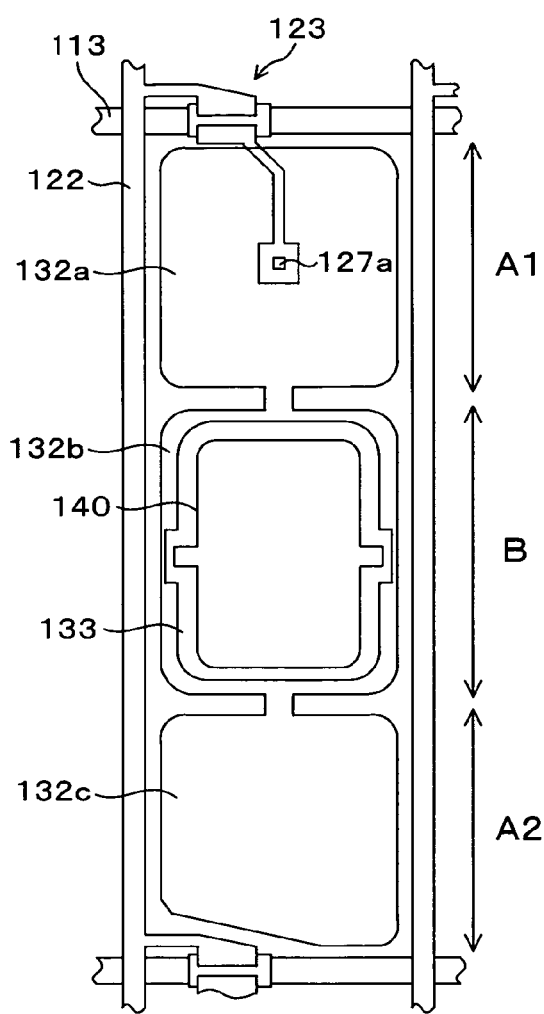
FIGS. 12A and 12B are plan views showing modified example 1 of the liquid crystal display device according to the first embodiment.
Figure 12B:
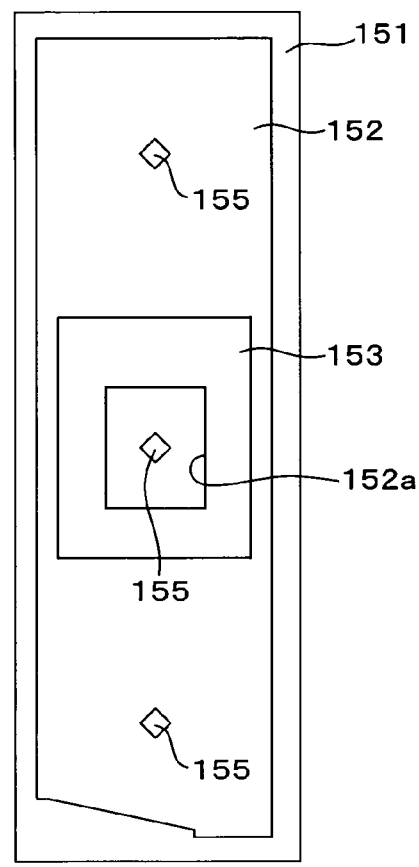

FIGS. 12A and 12B are plan views showing modified example 1 of the liquid crystal display device of this embodiment. FIG. 12A is a plan view of a TFT substrate, and FIG. 12B is a plan view of a counter substrate.

On the TFT substrate, a plurality of gate bus lines 113 extended in a horizontal direction and a plurality of data bus lines 122 extended in a vertical direction are formed. The gate bus lines 113 are formed at a pitch of about 300 μm, for example, and the data bus lines 122 are formed at a pitch of about 100 μm, for example. Each of rectangular regions divided by the gate bus lines 113 and the data bus lines 122 is a picture element region. One picture element region is divided into a first transmission region A1, a reflection region B and a second transmission region A2. The first transmission region A1, the reflection region B and the second transmission region A2 are disposed in this order from the above along the data bus line 122.

In the reflection region B, a reflecting electrode 133 is disposed, which has irregularities provided on its surface by use of any of the structures shown in FIGS. 9A to 9D. In the first and second transmission regions A1 and A2, transparent electrodes 132a and 132c are formed, respectively, which are made of transparent conductors such as ITO. Moreover, a transparent electrode 132b made of a transparent conductor is also formed on the reflecting electrode 133. The transparent electrodes 132a to 132c and the reflecting electrode 133 are electrically connected to each other. Moreover, the transparent electrode 132a is electrically connected to a source electrode of a TFT 123 through a contact hole 127a.

Meanwhile, on the counter substrate, a black matrix 151, a color filter 152, a gap adjusting film 153, a common electrode (not shown in FIG. 12B) and orientation control protrusions 155 are formed. The black matrix 151 is made of, for example, a metal film such as Cr or a black resin and is disposed at a position facing a formation region of the gate bus lines 113, the data bus lines 122 and the TFT 123 on the TFT substrate.

There are three kinds of color filters 152, including red (R), green (G) and blue (B) ones, and any one of the red, green and blue color filters is disposed for each picture element. A thickness of the color filter 152 is, for example, 1.3 µm. As shown in a schematic cross-sectional view of FIG. 13, an opening 152a is provided at a position facing a center portion of the reflecting electrode 133. The opening 152a is for compensating a difference in color purity attributable to that, while light is transmitted once through the color filter 152 in the transmission regions, light is transmitted twice (back and forth) through the color filter 152 in the reflection region. A size of the opening 152a is 25% of the size of the reflecting electrode 133, for example. Note that, in FIG. 13, reference numeral 110 denotes a glass substrate to be a base of the TFT substrate, and reference numeral 150 denotes a glass substrate to be a base of the counter substrate.

Inside the opening 152a, a transparent and colorless resin is buried, which forms the gap adjusting film 153. The gap adjusting film 153 is formed to have a thickness of, for example, 2 µm at a position facing the reflecting electrode 133. On surfaces (lower surfaces in FIG. 13) of the color filter 152 and the gap adjusting film 153, a common electrode 154 made of a transparent conductor such as ITO is formed.

On a surface (lower surface in FIG. 13) of the common electrode 154, the orientation control protrusions 155 are formed at positions facing center portions of the first and second transmission regions A1 and A2 and the reflection region B, respectively. In this embodiment, liquid crystal having negative dielectric constant anisotropy is used. In this case, liquid crystal molecules in the vicinities of the orientation control protrusions 155 are oriented in a direction perpendicular to faces of the protrusions 155. Accordingly, the liquid crystal molecules in the picture element are tilted toward the orientation control protrusions 155 when a voltage is applied. Thus, a so-called multidomain is achieved to improve viewing angle characteristics.

Figure 13:
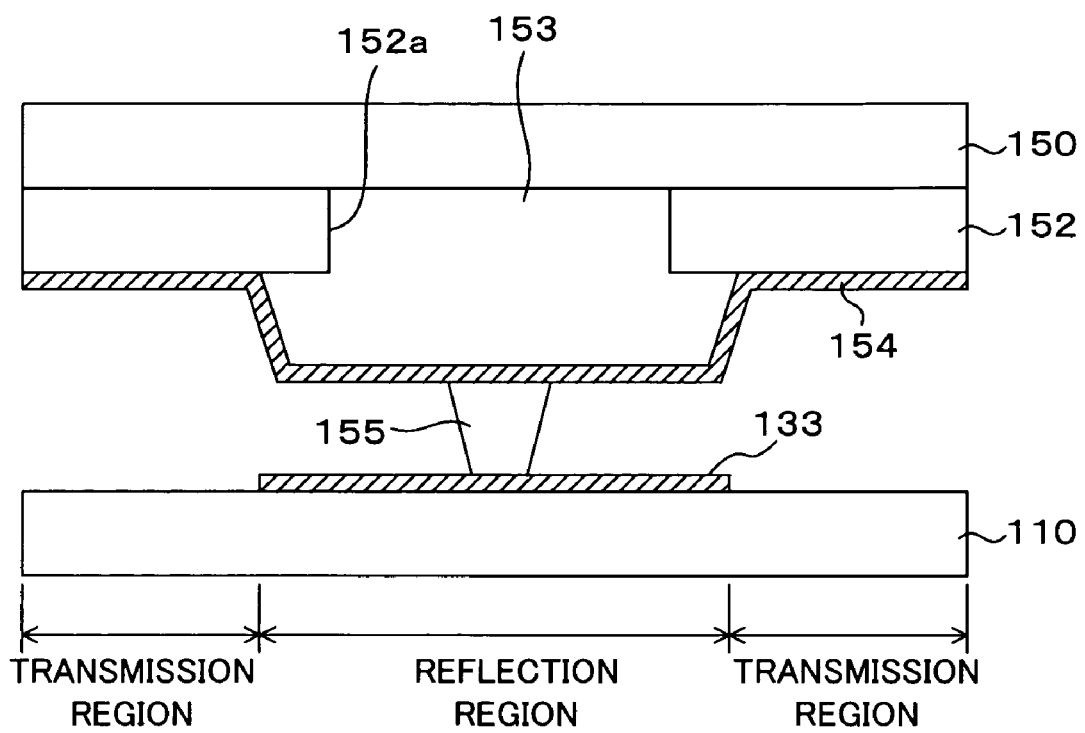
FIG. 13 is a schematic cross-sectional view of modified example 1 of the liquid crystal display device according to the first embodiment.

Moreover, the orientation control protrusion 155 disposed in the reflection region B comes into contact with the TFT substrate as shown in FIG. 13, and serves as a spacer for maintaining a fixed gap between the TFT substrate and the counter substrate. A height of the orientation control protrusion 155 is set to the same value as that of the thickness of the gap adjusting film 153. Thus, a cell gap in the reflection region B is set to be ½ of a cell gap in the transmission regions A1 and A2. Accordingly, an optical path length of light passing through the transmission regions A1 and A2 in a liquid crystal layer is set the same as an optical path length of light passing through the reflection region B in the liquid crystal layer. As a result, light transmitted through the transmission regions A1 and A2 and emitted toward a front side of the panel and light reflected by the reflection region B and emitted toward the front side of the panel are set to have the same phase difference conditions. Thus, optical compensation conditions in black display can be set the same in the transmission regions and the reflection region is.

A vertical orientation film made of polyimide is applied to the TFT substrate and the counter substrate, which are configured as described above. Thereafter, liquid crystal having negative dielectric constant anisotropy is sealed between the substrates to form a liquid crystal panel. Subsequently, circular polarizing plates are disposed on both sides of the liquid crystal panel, and a backlight and a drive circuit are attached thereto. Thus, the liquid crystal display device is completed. Note that each of the circular polarizing plates is formed by attaching a linear polarizer to a λ/4 wavelength plate. The linear polarizer on the TFT substrate and the linear polarizer on the counter substrate are disposed so as to set absorption axes thereof to be at right angles to each other. Moreover, the λ/4 wavelength plate on the TFT substrate and the λ/4 wavelength plate on the counter substrate are disposed so as to set delay phase axes thereof to be at right angles to each other.

Figure 14A:
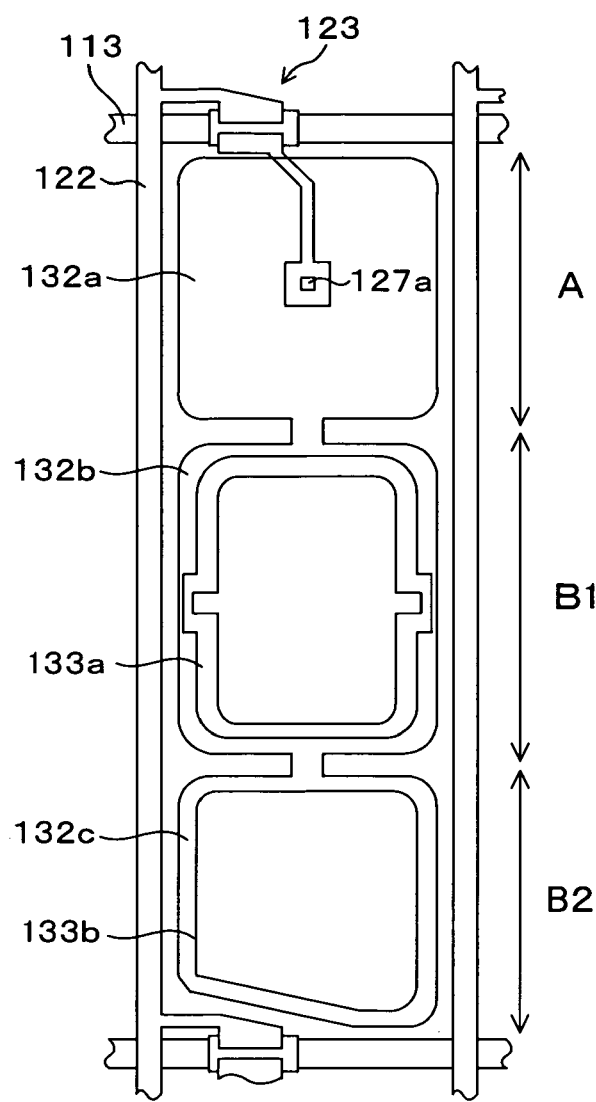
FIGS. 14A and 14B are plan views showing modified example 2 of the liquid crystal display device according to the first embodiment.
Figure 14B:
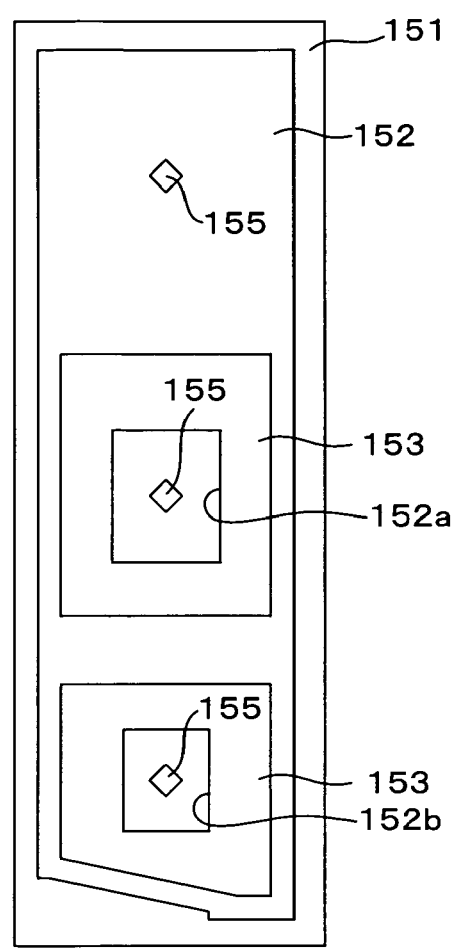

FIGS. 14A and 14B are plan views showing modified example 2 of the liquid crystal display device according to this embodiment. FIG. 14A is a plan view of a TFT substrate, and FIG. 14B is a plan view of a counter substrate. Note that, in FIGS. 14A and 14B, the same parts as those shown in FIGS. 12A and 12B are denoted by the same reference numerals, and detailed description thereof will be omitted.

In modified example 2, one picture element region is divided into a transmission region A, a first reflection region B1 and a second reflection region B2. The transmission region A, the first reflection region B1 and the second reflection region B2 are disposed in this order from the above along the data bus line 122.

In the first and second reflection regions B1 and B2, reflecting electrodes 133a and 133b are disposed, which have irregularities provided on their surfaces by use of any one of the structures shown in FIGS. 9A to 9D. In the transmission region A, a transparent electrode 132a is formed, which is made of a transparent conductor such as ITO. Moreover, transparent electrodes 132b and 132c made of transparent conductors are also formed on the reflecting electrodes 133a and 133b. The transparent electrodes 132a to 132c and the reflecting electrodes 133a and 133b are electrically connected to each other. Moreover, the transparent electrode 132a is electrically connected to a source electrode of a TFT 123 through a contact hole 127a.

Meanwhile, in a color filter 152 on the counter substrate, openings 152a and 152b are formed at positions corresponding to center portions of the reflecting electrodes 133a and 133b. Moreover, in the first and second reflection regions B1 and B2 on the counter substrate, gap adjusting films 153 made of transparent and colorless resins are formed, respectively. The gap adjusting films 153 set a cell gap in the first and second reflection regions B1 and B2 to be ½ of a cell gap in the transmission region A.

Furthermore, on the counter substrate, orientation control protrusions 155 are formed at positions corresponding to centers of the transmission region A and the first and second reflection regions B1 and B2, respectively. At least one of the protrusions 155 in the first and second reflection regions B1 and B2 comes into contact with the TFT substrate and also serves as a spacer.

Second Embodiment

Figure 15:
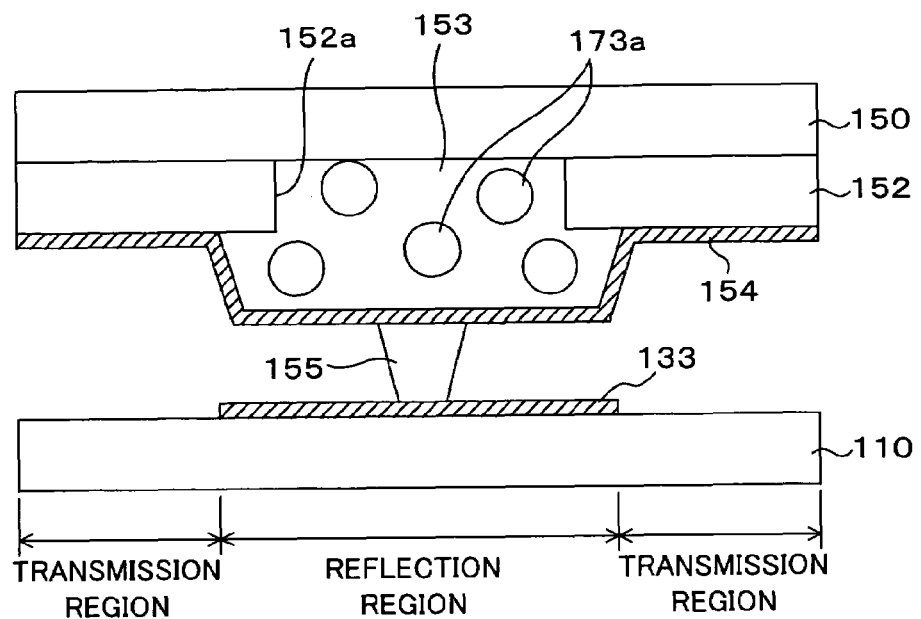
FIG. 15 is a schematic view showing a cross section of a reflection region in a liquid crystal display device according to a second embodiment of the present invention.

FIG. 15 is a schematic view showing a cross section of a reflection region in a liquid crystal display device according to a second embodiment of the present invention. A difference between the liquid crystal display device of this embodiment and the liquid crystal display device of modified example 1 of the first embodiment shown in FIGS. 12 and 13 is that diffusing particles which diffuse light are contained in a gap adjusting film. A basic structure of the liquid crystal display device of this embodiment other than the above point is the same as that of the liquid crystal display device of modified example 1 of the first embodiment. Thus, in FIG. 15, the same parts as those shown in FIG. 13 are denoted by the same reference numerals, and repetitive description will be omitted.

In this embodiment, diffusing particles 173a (produced by Sekisui Plastics Co., Ltd.) are added in the proportion of 10 wt % into a resin to be a base material of a gap adjusting film 153 which adjusts a cell gap in the reflection region. Specifically, the diffusing particles 173a are made of polymethylmethacrylate (hereinafter called PMMA) and have a particle size of 1.5 to 2 μm. By adding the diffusing particles 173a into the gap adjusting film 153 as described above, light passing through the reflection region is diffused. Thus, it is possible to further improve viewing angle characteristics when the liquid crystal display device is used as a reflective liquid crystal display device.

Figure 16:
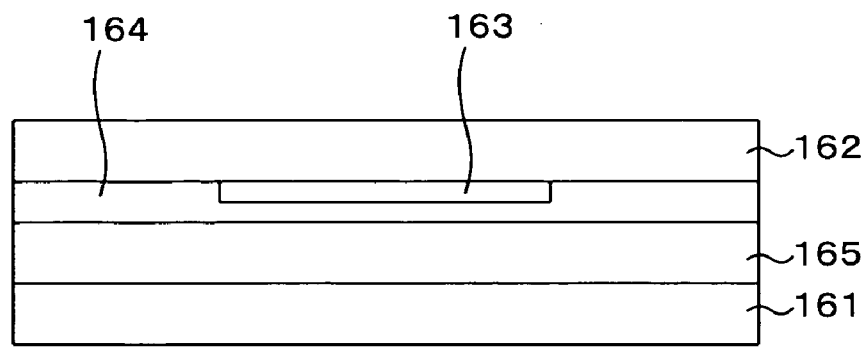
FIG. 16 is a schematic view showing a liquid crystal display device (conventional example) in which a light scattering film containing amorphous particles is formed in a reflection region of a counter substrate, and a color filter is formed thereon.

There has heretofore been known a reflective liquid crystal display device having viewing angle characteristics improved by disposing a light scattering film between a liquid crystal panel and a polarizing plate, for example. However, if this structure is applied to a transflective liquid crystal display device, an excessive diffusing capacity is given to a transmission region and transmittance is lowered. As a result, there arises a problem that a contrast ratio is reduced. Japanese Patent Laid-Open No. 2002-365622 proposes a liquid crystal display device in which a light scattering film 163 containing amorphous particles is formed in a reflection region of a counter substrate 162 and a color filter 164 is formed thereon, as shown in FIG. 16. Note that, in FIG. 16, reference numeral 161 denotes a TFT substrate and reference numeral 165 denotes liquid crystal sealed between the TFT substrate 161 and the counter substrate 162.

In the liquid crystal display device described above, viewing angle characteristics in the reflection region can be improved without lowering transmittance in a transmission region. Moreover, in the liquid crystal display device described above, the color filter 164 in the reflection region is made thinner than the color filter 164 in the transmission region by the thickness of the light scattering film 163. Thus, color purity in the reflection region can be approximated to color purity in the transmission region. However, the liquid crystal display device described in Japanese Patent Laid-Open No. 2002-365622 has the following problems.

In order to sufficiently scatter light, it is required to form the light scattering film 163 to have a certain thickness or more. However, in the liquid crystal display device described in Japanese Patent Laid-Open No. 2002-365622, the light scattering film 163 cannot be formed to have a thickness larger than that of the color filter 164. In an ordinary transmission liquid crystal display device, a color filter has a thickness of about 1.2 to 1.8 μm. Therefore, in order to sufficiently scatter light and to set color purity in a reflection region to be approximately the same as that in a transmission region, it is required to set the thickness of the light scattering film 163 to 0.6 to 0.9 μm. Moreover, diffusing particles which can be added into the light scattering film 163 are required to have a particle size of 0.6 to 0.9 μm or less. However, it is difficult to manufacture such minute amorphous particles and a range of options to select a material is significantly limited. At the same time, material costs are also increased.

Meanwhile, in this embodiment, as shown in FIG. 15, the opening 152a is formed in the color filter 152 and the gap adjusting film 153 containing the diffusing particles 173a is formed thereon. Thus, the particle size of the diffusing particles 173a is never limited by the thickness of the color filter 152. Consequently, the range of options to select the diffusing particles is extended, and an increase in costs can be suppressed.

Meanwhile, the magnitude of the diffusing capacity, that is, a haze value is determined by a difference in refractive index between the gap adjusting film and the diffusing particles and by a content of the diffusing particles. The larger the difference in refractive index and the higher the content of the diffusing particles, the more the haze value is increased. Moreover, the larger the haze value, the more the reflectance is increased. However, if the haze value is too large, stray light is caused by back scattering. Thus, the contrast ratio is lowered when the liquid crystal display device is used as a reflective liquid crystal display device.

Hereinafter, description will be given of results obtained by examining the reflectance and the contrast ratio after the liquid crystal display device according to this embodiment was manufactured.

As example 1, a liquid crystal display device was manufactured, which had a gap adjusting film containing diffusing particles (PMMA) by a content of 10 wt %, as shown in FIG. 15. When a haze value of the gap adjusting film was checked, the haze value was 40%. Moreover, a reflectance in a reflection region of the liquid crystal display device was 1.3 times as large as that of a liquid crystal display device containing no diffusing particles in the gap adjusting film, in other words, the liquid crystal display device of modified example 1 of the first embodiment shown in FIGS. 12 and 13 (hereinafter referred to as comparative example 1). Meanwhile, when a contrast ratio in a case where the device was used as a reflective liquid crystal display device was examined, the contrast ratio was 0.9 times as large as that of the liquid crystal display device of comparative example 1. Thus, lowering of the contrast ratio was small.

As example 2, a liquid crystal display device similar to that of example 1 except for that a content of diffusing particles in a gap adjusting film is 20 wt % was manufactured. When a haze value of the gap adjusting film was checked, the haze value was 80%. Moreover, a reflectance in a reflection region of the liquid crystal display device was 1.7 times as large as that of the liquid crystal display device of comparative example 1. This is assumed to be because light reflected from a flat part (regions between irregular patterns) on the surface of the reflecting electrode was diffused by the diffusing particles. When a contrast ratio when the device was used as a reflective liquid crystal display device was examined, the contrast ratio was 0.6 times as large as that of the liquid crystal display device of comparative example 1.

Figure 17:
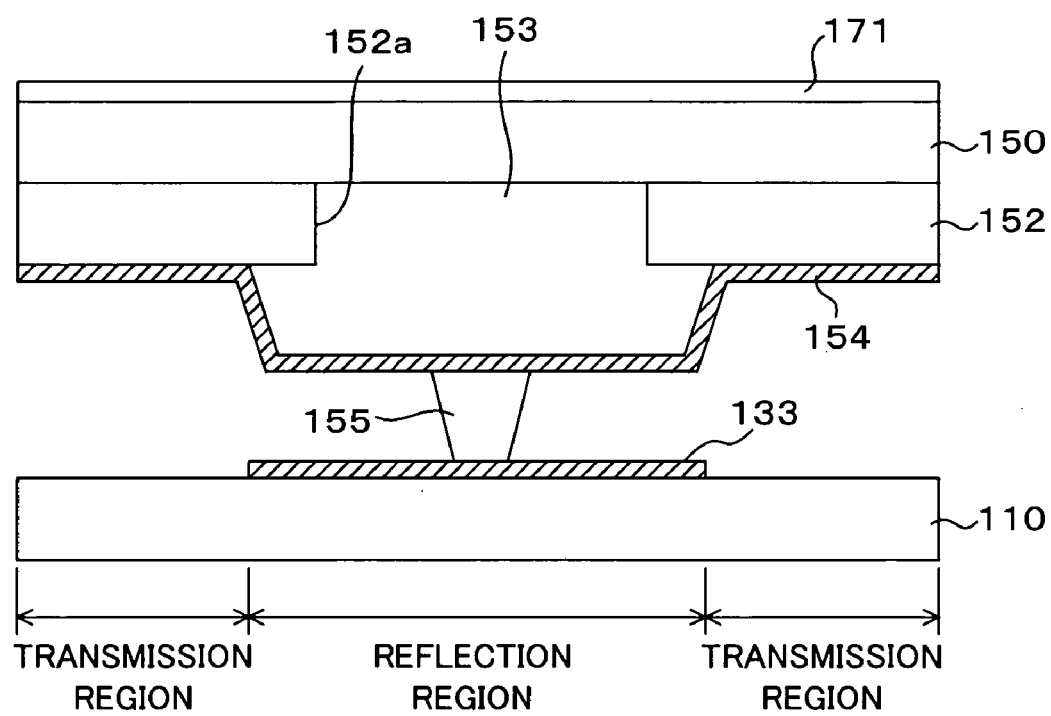
FIG. 17 is a cross-sectional view showing a structure of a liquid crystal display device of comparative example 2 according to the second embodiment.

As comparative example 2, manufactured was a liquid crystal display device having the same structure as that of example 1 except for that a diffusion film 171 having silica particles added therein was provided between a glass substrate 150 to be a base of a counter substrate and a polarizing plate (not shown), and no diffusing particles 173a were contained in a gap adjusting film 153, as shown in FIG. 17. When a haze value of the diffusion film 171 was checked, the haze value was 80%. As a result of measuring a reflectance and a contrast ratio of the liquid crystal display device described above, the reflectance was improved compared with that of the liquid crystal display device of comparative example 1. However, the contrast ratio was 0.6 times as large as that of the liquid crystal display device of comparative example 1.

Figure 18:
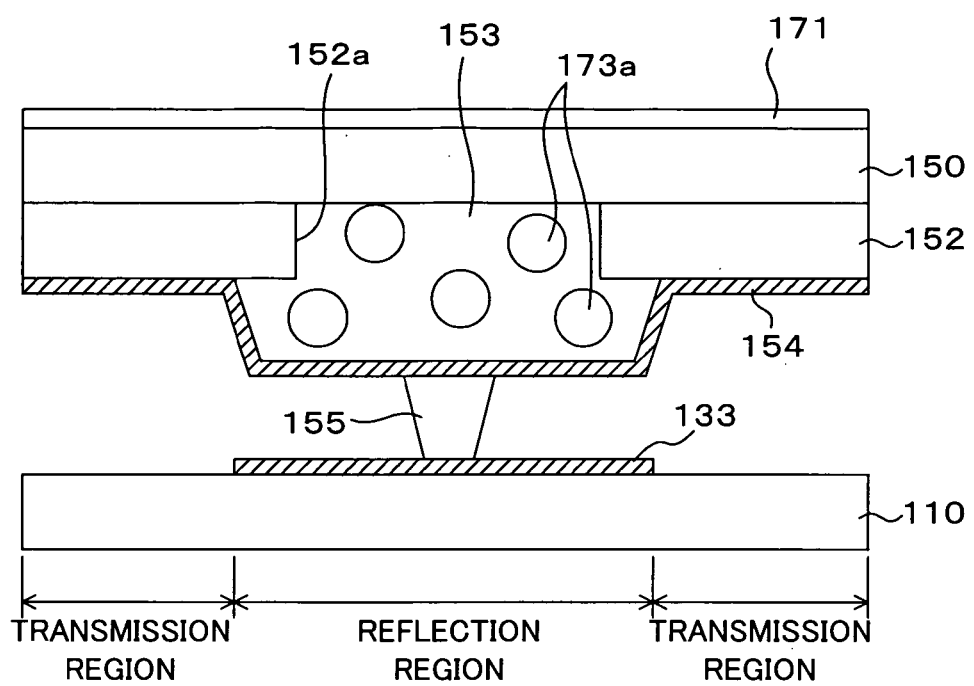
FIG. 18 is a cross-sectional view showing a structure of a liquid crystal display device of example 3 according to the second embodiment.

As example 3, manufactured was a liquid crystal display device having the same structure as that of example 1 except for that a diffusion film 171 having silica particles added therein was provided between a glass substrate 150 to be a base of a counter substrate and a polarizing plate (not shown), as shown in FIG. 18. A haze value of a gap adjusting film 153 was 40%, and a haze value of the diffusion film 171 was 40%. As a result of measuring a reflectance and a contrast ratio of the liquid crystal display device described above, the reflectance was set about 1.7 times as large as that of the liquid crystal display device of comparative example 1, and the contrast ratio was 0.8 times as large as that of the liquid crystal display device of comparative example 1.

Based on comparison between example 1 and example 2, it was found out that the haze value of the gap adjusting film 153 is preferably set to about 40%. Moreover, based on example 3, it was found out that, if the gap adjusting film 153 having the haze value of 40% and the diffusion film 171 having the haze value of 40% are used in combination, the reflectance can be further improved compared with that of example 1 and lowering of contrast is relatively small.

Third Embodiment

Figure 19:
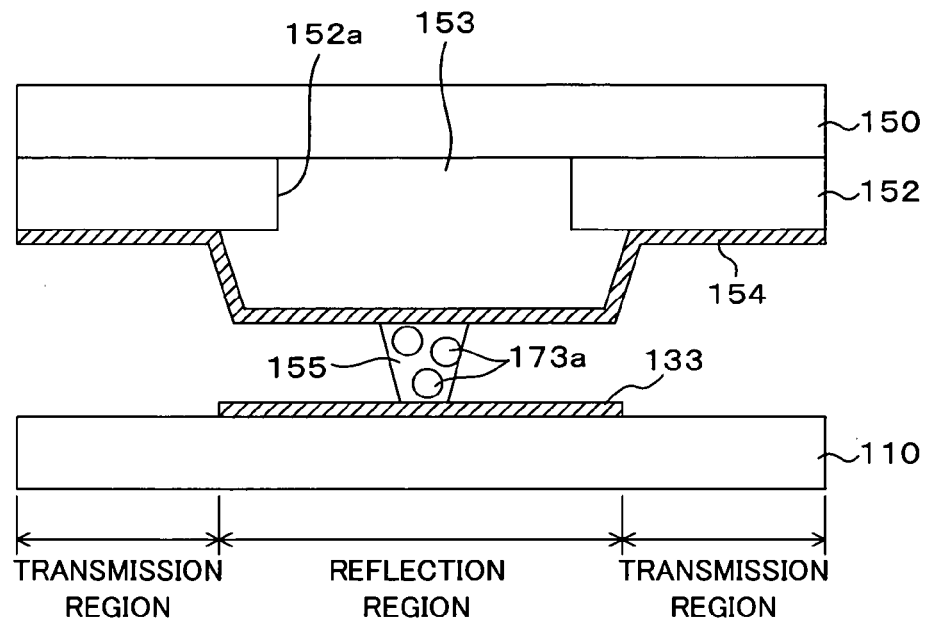
FIG. 19 is a schematic view showing a cross section of a reflection region in a liquid crystal display device according to a third embodiment of the present invention.

FIG. 19 is a schematic view showing a cross section of a reflection region in a liquid crystal display device according to a third embodiment of the present invention. A difference between the liquid crystal display device of this embodiment and the liquid crystal display device of modified example 1 of the first embodiment shown in FIGS. 12 and 13 is that diffusing particles which diffuse light are contained in an orientation control protrusion in the reflection region. A basic structure of the liquid crystal display device of this embodiment other than the above point is the same as that of the liquid crystal display device of modified example 1 of the first embodiment. Thus, in FIG. 19, the same parts as those shown in FIG. 13 are denoted by the same reference numerals, and repetitive description will be omitted.

In this embodiment, diffusing particles 173a made of PMMA are added in the proportion of 10 wt % into a resin to be a base material of an orientation control protrusion 155 in the reflection region. This is because of the following reason. Specifically, by allowing the orientation control protrusion 155 to contain the diffusing particles 173a as described above, a diffusing capacity is given to the orientation control protrusion 155, and an influence of back scattering is reduced so that lowering of a contrast ratio when the device is used as a reflective liquid crystal display device is minimized.

Figure 20:
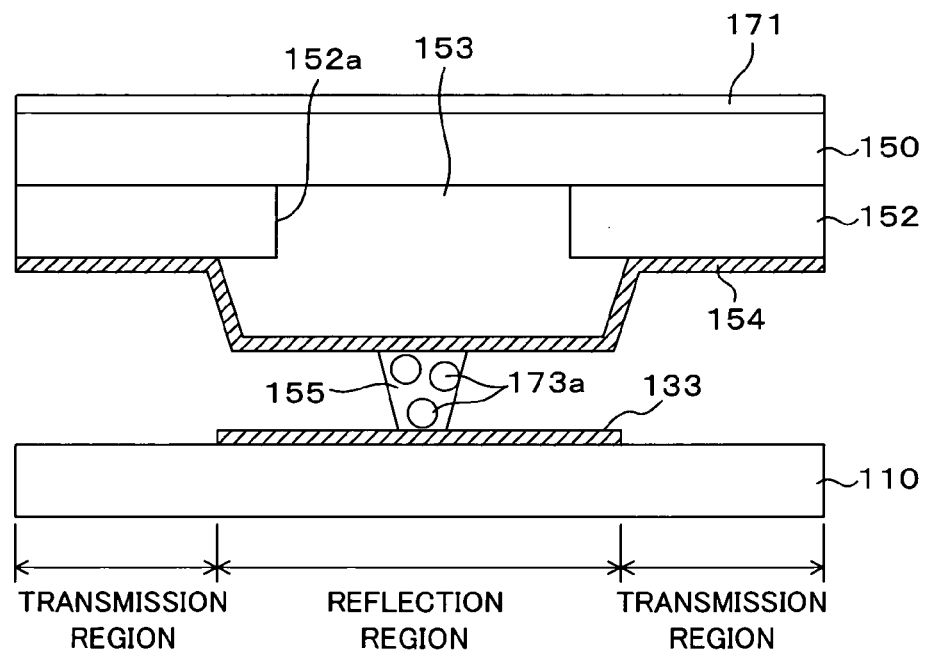
FIG. 20 is a schematic view showing a cross section of a liquid crystal display device of a modified example according to the third embodiment of the present invention.

As shown in FIG. 20, a diffusion film 171 made of a resin containing silica particles may be further provided between a glass substrate 150 and a polarizing plate (not shown). After a liquid crystal display device having the structure shown in FIG. 20 was manufactured, a reflectance and a contrast ratio were examined. As a result, the reflectance was about 1.5 times as large as that of the liquid crystal display device of modified example 1 of the first embodiment shown in FIGS. 12 and 13 and the contrast ratio was 0.9 times as large as that thereof.

Fourth Embodiment

Figure 21A:
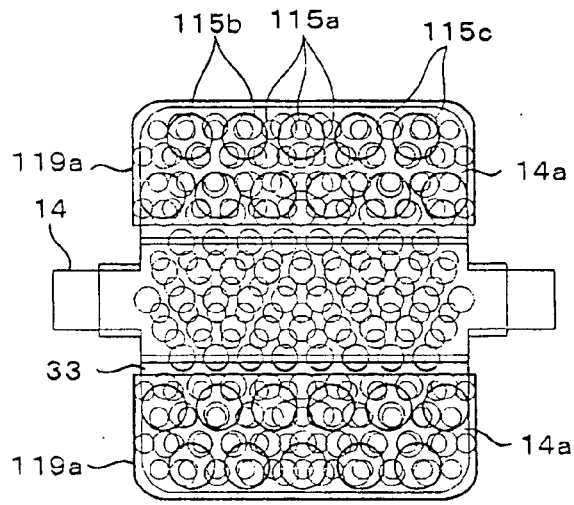
FIGS. 21A to 21C are plan views showing a reflection region in a liquid crystal display device according to a fourth embodiment of the present invention.
Figure 21B:
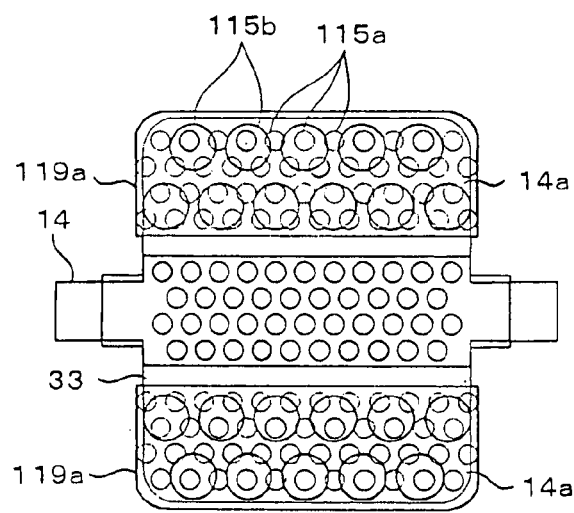
Figure 21C:
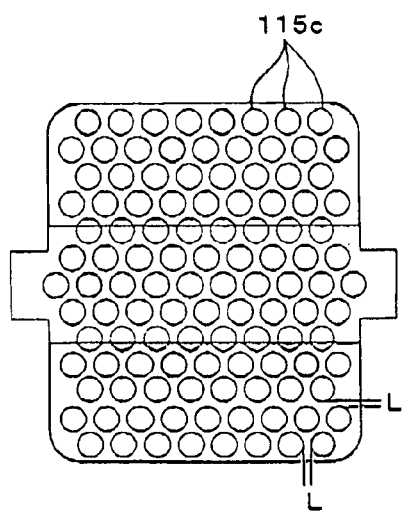

FIG. 21A is a plan view showing a reflection region in a liquid crystal display device according to a fourth embodiment of the present invention. FIG. 21B is also a plan view showing overlaps in openings between a wide portion of an auxiliary capacitance bus line 14 and first metal film patterns 14a, and second insulating film/insulating film patterns 119a in the reflection region. FIG. 21C is also a plan view showing arrangement of openings formed in a third insulating film in the reflection region. A difference between the liquid crystal display device of this embodiment and the liquid crystal display device of the first embodiment shown in FIG. 6 is that openings are also provided in a third insulating film formed on a data bus line and a TFT. A basic structure of the liquid crystal display device of this embodiment other than the above point is the same as that of the liquid crystal display device of the first embodiment. Thus, in FIGS. 21A to 21C, the same parts as those shown in FIG. 6 are denoted by the same reference numerals, and repetitive description will be omitted.

Note that, in the following description, a G layer indicates a metal film (a first metal film) for formation of gate bus lines and auxiliary capacitance bus lines, a SA layer indicates an insulating film (a second insulating film) for formation of a channel protection film, which is formed on a gate insulating film (a first insulating film), an I layer indicates a metal film (a second metal film) for formation of data bus lines, source and drain electrodes of a TFT and an auxiliary capacitance electrode, a C layer indicates an insulating film (a third insulating film) which covers the data bus lines, the TFT and the auxiliary capacitance electrode, a RE layer indicates a metal film for formation of a reflecting electrode, and a Px layer indicates a transparent conductor film for formation of a transparent electrode.

Also in this embodiment, a diameter S of openings 115a formed in a wide portion of the auxiliary capacitance bus line 14 and first metal film patterns 14a disposed on both sides thereof (both of which are the G layer) is 4 μm and an interval L is 1.75 μm (both of which are finished dimensions). Moreover, a diameter S of openings 115b formed in the insulating film patterns 119a (the SA layer) on the first metal film patterns 14a is 9 μm and an interval L is 5 μm. Furthermore, in this embodiment, in the third insulating film (the C layer) which covers the data bus lines, the TFT and the like, openings 115c having a diameter S of 5 μm are formed with an interval L of 2 μm in horizontal and longitudinal directions.

The third insulating film (the C layer) is patterned by the stepper exposure as described above. In this case, a lower limit of a mask dimension determined by a resolution is 2.75 to 3 μm. However, since the third insulating film is thicker than the metal film, a cross-sectional shape of the formed openings becomes an inverted trapezoid (a forward tapered shape). Accordingly, a dimension of an upper part (top) is different from a dimension of a lower part (bottom). Thus, if the mask dimension when the openings are formed is set to the lower limit determined by the resolution or to the vicinity thereof, upper parts (tops) of the adjacent openings 115c are connected to each other.

Specifically, the lower limit of the mask dimension determined by the resolution corresponds to a bottom dimension of the openings. However, the top dimension of the openings is larger than the bottom dimension thereof by about 2 μm. Thus, in order not to connect the tops of the openings, it is required to separate the openings by 3 μm or more in the mask dimension and by 2 μm or more in the finished dimension. It is also conceivable to give azimuthal dependence to a reflectance by connecting tops or bottoms of the openings 115c aligned in one direction. However, in this embodiment, in order to equalize the reflectance in all directions, a structure in which the upper parts (tops) of the openings 115c are not connected to each other is formed by setting the diameter and the interval of the openings 115c as described above.

Note that, in this embodiment, a reflecting electrode formation layer (the RE layer), which is made of a Mo/Al film, and a transparent electrode formation layer (the Px layer) are laminated on the third insulating film (the C layer). The auxiliary capacitance is formed of the auxiliary capacitance bus lines (the G layer) and the auxiliary capacitance electrode (the I layer), which are disposed so as to face each other through the second insulating film (the SA layer). Moreover, the auxiliary capacitance electrode (the I layer) and the transparent electrode (the Px layer) come into contact with each other through the openings 115c in the third insulating film (the C layer). Furthermore, the transparent electrode (the Px layer) and the reflecting electrode (the RE layer) come into contact with each other through a Mo film.

A linear density in the reflection region of the liquid crystal display device of this embodiment is 0.9, which is about twice as large as that of the liquid crystal display device of the first embodiment shown in FIG. 6. Moreover, a reflectance is also set about twice as large as that of the liquid crystal display device of the first embodiment. In this embodiment, the number of processes is increased for the formation of the openings 115c, compared with the liquid crystal display device of the first embodiment shown in FIG. 6. However, bright reflection display is possible without a diffusion film.

Fifth Embodiment

FIG. 22A is a plan view showing a reflection region in a liquid crystal display device according to a fifth embodiment of the present invention. FIG. 22B is also a plan view showing overlaps in openings between a G layer (a wide portion of an auxiliary capacitance bus line 14 and first metal film patterns 14a) and a SA layer (a second insulating film/insulating film patterns 119a), which are in the reflection region. FIG. 22C is a plan view showing overlaps in openings between an auxiliary capacitance electrode (an I layer) and a third insulating film (a C layer). A difference between the liquid crystal display device of this embodiment and that of the fourth embodiment shown in FIGS. 21A to 21C is that openings are also provided in the I layer. A basic structure of the liquid crystal display device of this embodiment other than the above point is the same as that of the fourth embodiment. Thus, in FIGS. 22A to 22C, the same parts as those shown in FIGS. 21A to 21C are denoted by the same reference numerals, and repetitive description will be omitted.

In this embodiment, openings 115d in the auxiliary capacitance electrode (the I layer) has a diameter S of 4 μm, and an interval L therebetween is set to 1.75 μm. Moreover, an L/S value is 0.44 (L/S=1.75 μm/4 μm). Here, a finished dimension and a mask dimension of the openings 115d are the same as those of the openings 115a in the auxiliary capacitance bus lines of the G layer and the first metal film patterns. However, the openings 115d in the I layer are arranged while being shifted from the openings 115a in the G layer by a ½ pitch.

Note that, in this embodiment, a reflecting electrode formation layer (a RE layer), which is made of a Mo/Al film, and a transparent electrode formation layer (a Px layer) are laminated on the third insulating film (the C layer). Moreover, the auxiliary capacitance is formed of the auxiliary capacitance bus lines (the G layer), and the auxiliary capacitance electrode (the I layer) and the reflecting electrode (the RE layer), which are disposed so as to face each other through a second insulating film (a SA layer). Moreover, the auxiliary capacitance electrode (the I layer) and the transparent electrode (the Px layer) come into contact with each other through the openings 115c in the third insulating film (the C layer). Furthermore, the transparent electrode (the Px layer) and the reflecting electrode (the RE layer) come into contact with each other through a Mo film.

A linear density in the reflection region of the liquid crystal display device of this embodiment is 1.0, which is about 2.5 times as large as that of the liquid crystal display device of the first embodiment shown in FIG. 6. In this embodiment, the number of processes is increased for the formation of the openings 115c, compared with the liquid crystal display device of the first embodiment shown in FIG. 6. However, bright reflection display is possible without a diffusion film.

Note that, in the first to fifth embodiments described above, the description was given of the example where the present invention is applied to the transflective liquid crystal display device. However, as a matter of course, the present invention can be applied to a reflective liquid crystal display device. Moreover, the present invention is not limited to the liquid crystal display devices having the structures described in the first to fifth embodiments, but can be applied to another liquid crystal display device having a reflective film.

What is claimed:

1. A liquid crystal display device, comprising:
a first substrate;
a second substrate which is disposed so as to face the first substrate and transmits light;
a reflective film which is formed on the first substrate and reflects light transmitted through the second substrate;
a plurality of films laminated between the first substrate and the reflective film; and
liquid crystal sealed between the first and second substrates,
wherein irregularities are formed on a surface of the reflective film by openings formed in at least one of the plurality of films, and a linear density defined by a sum of peripheral portion dimensions of the openings per area of a triangle consisting of lines connecting respectively center points of adjacent three openings is equal to 0.2 or more.

2. The liquid crystal display device according to claim 1, wherein a display voltage is supplied to the reflective film, and a common electrode facing the reflective film is formed on the second substrate.

3. The liquid crystal display device according to claim 1, wherein the openings have any of circular and polygonal shapes, and, when it is assumed that any of a diameter and a full width of the openings is S and an interval between the openings is L, an L/S value is equal to 1 or less.

4. The liquid crystal display device according to claim 3, wherein openings are formed in two of the plurality of films, respectively, the L/S value of the openings in one of the films is approximately equal to the L/S value thereof in the other film, and the openings in one of the films are disposed at positions shifted from the openings in the other film by approximately a ½ pitch.

5. The liquid crystal display device according to claim 3, wherein the L/S value of the openings in a specific direction is smaller than an L/S value thereof in another direction.

6. The liquid crystal display device according to claim 3, wherein the openings are partially connected to each other in a specific direction.

7. The liquid crystal display device according to claim 5, wherein the specific direction is any of a horizontal direction and a vertical direction.

8. The liquid crystal display device according to claim 1, wherein an auxiliary capacitance electrode is formed in a region where the openings are formed.

9. The liquid crystal display device according to claim 1, wherein an auxiliary capacitance electrode is formed around a region where the openings are formed.

10. The liquid crystal display device according to claim 1, wherein a transparent conductor film is formed on the reflective film.

11. The liquid crystal display device according to claim 1, wherein, on the second substrate, formed are a color filter having an opening provided in a portion facing at least a part of the reflective film, a gap adjusting film which fills in the opening of the color filter and is formed on the color filter, and an orientation control protrusion which is formed on the gap adjusting film at a position facing the center of the opening in the color filter.

12. The liquid crystal display device according to claim 11, wherein diffusing particles which diffuse light are contained in at least one of the gap adjusting film and the orientation control protrusion.

13. The liquid crystal display device according to claim 11, wherein the orientation control protrusion comes into contact with the first substrate and serves as a spacer.

14. The liquid crystal display device according to claim 1, wherein one picture element region has a reflection region, in which display is performed by use of light reflected by the reflective film, and a transmission region, in which display is performed by use of light transmitted through the first and second substrates.

15. The liquid crystal display device according to claim 1, wherein a diffusion film which diffuses light is disposed on a surface of the second substrate, which surface is opposite to a surface facing the liquid crystal.

* * * * *